United States Patent
Whitehead et al.

(10) Patent No.: US 6,744,404 B1
(45) Date of Patent: Jun. 1, 2004

(54) UNBIASED CODE PHASE ESTIMATOR FOR MITIGATING MULTIPATH IN GPS

(75) Inventors: Michael L. Whitehead, Scottsdale, AZ (US); Steven R. Miller, Cave Creek, AZ (US)

(73) Assignee: CSI Wireless Inc., Alberta (CA)

( * ) Notice: Subject to any disclaimer, the term of this patent is extended or adjusted under 35 U.S.C. 154(b) by 0 days.

(21) Appl. No.: 10/616,752

(22) Filed: Jul. 9, 2003

(51) Int. Cl.$^7$ ............................................... H04B 7/185
(52) U.S. Cl. ................................. 342/357.12; 375/148
(58) Field of Search ........................... 342/352, 357.06, 342/357.12; 701/213, 215; 375/144, 148, 149, 346

(56) References Cited

U.S. PATENT DOCUMENTS

| | | |
|---|---|---|
| 5,390,207 A | 2/1995 | Fenton et al. |
| 5,414,729 A | 5/1995 | Fenton |
| 5,808,582 A | 9/1998 | Woo |
| 5,809,064 A | 9/1998 | Fenton et al. |
| 5,963,582 A | 10/1999 | Stansell, Jr. |
| 6,160,841 A | 12/2000 | Stansell, Jr. et al. |
| 6,463,091 B1 * | 10/2002 | Zhodzicshsky et al. ..... 375/149 |
| 6,493,378 B1 * | 12/2002 | Zhodzishsky et al. ...... 375/149 |

OTHER PUBLICATIONS

L. R. Weill, "How Good Can it Get with New Signals? Multipath Mitigation," GPS World, Jun. 2003, www.gpsworld.com, P.P. 106–113.

* cited by examiner

*Primary Examiner*—Dao Phan
(74) *Attorney, Agent, or Firm*—Cantor Colburn LLP

(57) ABSTRACT

A method of measuring phase of a pseudorandom (PN) sequence of chips, the method includes: generating a reference model exhibiting a reference phase, the reference phase adjustable to facilitate alignment with the phase of the pseudorandom sequence; establishing a plurality of pulsed-windows over which a plurality of samples of the pseudorandom sequence are collected for a selected accumulation interval; and accumulating the plurality of samples for each pulsed-window of the plurality of pulsed windows to form a plurality of accumulated sums. The method also includes: compensating each accumulated sum to form at least one compensated sum, if a number of level transitions and non-transitions of the pseudorandom sequence is not equal; and combining the compensated sum to determine a phase error from the plurality of compensated sums, the phase error corresponding to a phase difference between the reference phase and the phase of the pseudorandom sequence.

23 Claims, 21 Drawing Sheets

| Clock-Edge Events within the 1023 chip-length C/A code of GPS | | | | | | |
|---|---|---|---|---|---|---|
| PRN | Total Non-Transitions (Nn) | | Total Level Transitions (Nt) | | Total L-H and H-L Polarity Transitions (Nt) | Total L-L and H-H Non Transitions (Nn) | Difference (previous two columns) |
| | L-L | H-H | L-H | H-L | | | |
| 1 | 256 | 255 | 256 | 256 | 512 | 511 | 1 |
| 2 | 256 | 255 | 256 | 256 | 512 | 511 | 1 |
| 3 | 256 | 255 | 256 | 256 | 512 | 511 | 1 |
| 4 | 256 | 255 | 256 | 256 | 512 | 511 | 1 |
| 5 | 256 | 255 | 256 | 256 | 512 | 511 | 1 |
| 6 | 256 | 255 | 256 | 256 | 512 | 511 | 1 |
| 7 | 272 | 271 | 240 | 240 | 480 | 543 | -63 |
| 8 | 240 | 239 | 272 | 272 | 544 | 479 | 65 |
| 9 | 256 | 255 | 256 | 256 | 512 | 511 | 1 |
| 10 | 256 | 255 | 256 | 256 | 512 | 511 | 1 |
| 11 | 256 | 255 | 256 | 256 | 512 | 511 | 1 |
| 12 | 256 | 255 | 256 | 256 | 512 | 511 | 1 |
| 13 | 256 | 255 | 256 | 256 | 512 | 511 | 1 |
| 14 | 256 | 255 | 256 | 256 | 512 | 511 | 1 |
| 15 | 272 | 271 | 240 | 240 | 480 | 543 | -63 |
| 16 | 256 | 255 | 256 | 256 | 512 | 511 | 1 |
| 17 | 272 | 271 | 240 | 240 | 480 | 543 | -63 |
| 18 | 256 | 255 | 256 | 256 | 512 | 511 | 1 |
| 19 | 256 | 255 | 256 | 256 | 512 | 511 | 1 |
| 20 | 256 | 255 | 256 | 256 | 512 | 511 | 1 |
| 21 | 272 | 271 | 240 | 240 | 480 | 543 | -63 |
| 22 | 240 | 239 | 272 | 272 | 544 | 479 | 65 |
| 23 | 256 | 255 | 256 | 256 | 512 | 511 | 1 |
| 24 | 272 | 271 | 240 | 240 | 480 | 543 | -63 |
| 25 | 256 | 255 | 256 | 256 | 512 | 511 | 1 |
| 26 | 256 | 255 | 256 | 256 | 512 | 511 | 1 |
| 27 | 256 | 255 | 256 | 256 | 512 | 511 | 1 |
| 28 | 256 | 255 | 256 | 256 | 512 | 511 | 1 |
| 29 | 256 | 255 | 256 | 256 | 512 | 511 | 1 |
| 30 | 256 | 255 | 256 | 256 | 512 | 511 | 1 |
| 31 | 256 | 255 | 256 | 256 | 512 | 511 | 1 |
| 32 | 256 | 255 | 256 | 256 | 512 | 511 | 1 |

FIG. 15

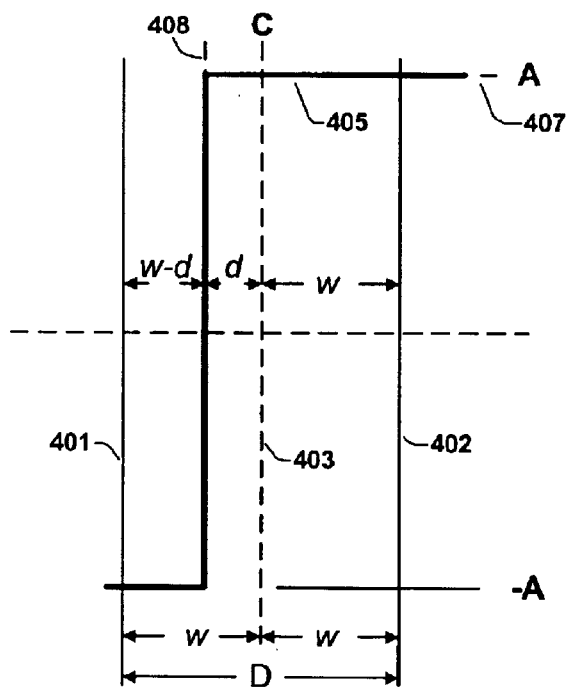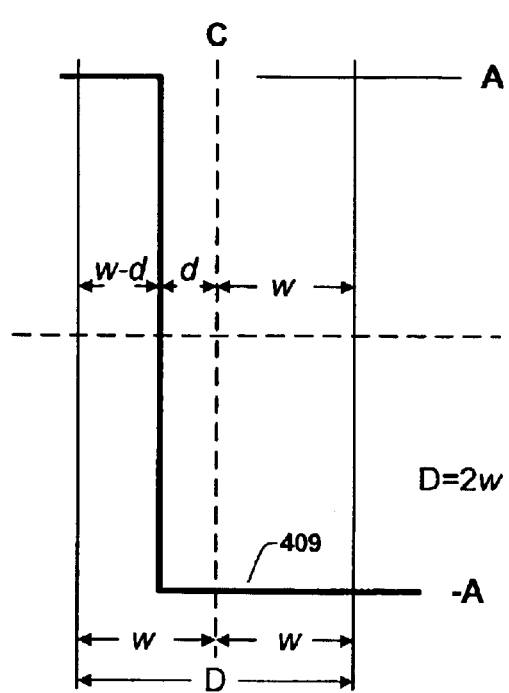
FIG. 16A L-H Transition
FIG. 16B H-L Transition

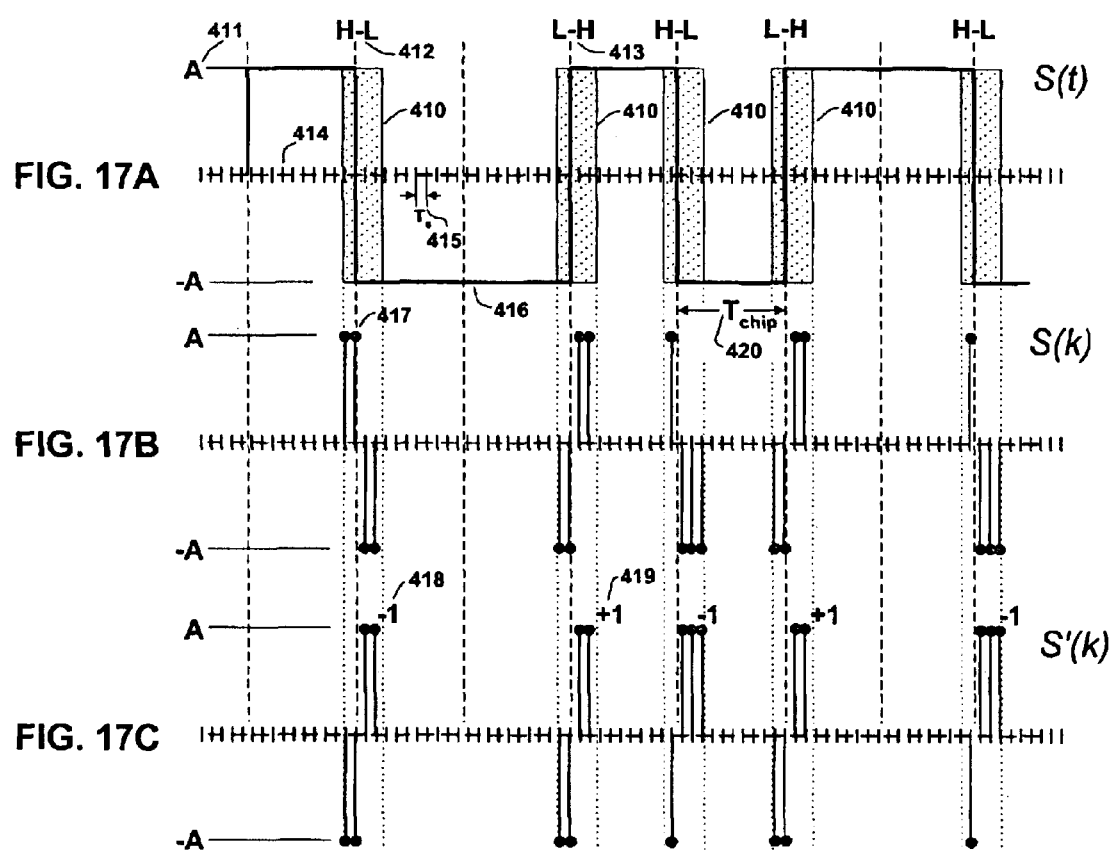

UNBIASED CODE PHASE ESTIMATOR FOR MITIGATING MULTIPATH IN GPS

FIELD OF INVENTION

The invention relates generally to Global Positioning Receivers (GPS) receivers or to any navigation receiver that receives pseudorandom noise (PN) encoded signals, and particularly, to receivers that that achieve reduction in errors resulting from multipath.

BACKGROUND

The Global Positioning System (GPS) was established by the United States government, and employs a constellation of 24 or more satellites in well-defined orbits at an altitude of approximately 26,500 km. These satellites continually transmit microwave L-band radio signals in two frequency bands, centered at 1575.42 MHz and 1227.6 MHz, denoted as L1 and L2 respectively. These signals include timing patterns relative to the satellite's onboard precision clock (which is kept synchronized by ground stations) as well as a navigation message giving the precise orbital positions of the satellites, an ionosphere model and other useful information. GPS receivers process the radio signals, computing ranges to the GPS satellites, and by triangulating these ranges, the GPS receiver determines its own position and its own internal clock error.

The GPS satellites transmit timing information by modulating pseudorandom codes on both the L1 and L2 frequencies. These codes, referred to as PN, or PRN codes, are binary sequences of +1 and −1 as depicted in FIG. 1 (sometimes, 1's and 0's rather than 1 and −1 are used for notational convenience). Pseudorandom codes, known as the P or P(Y) codes, are present on both L1 and L2 GPS frequencies; have chipping rates of 10.23 MHz; and repeat every week (actually, only the P portion of the P(Y) code repeats every week, the Y portion is additional modulation layer for the purpose of anti-spoofing and is unknown to civilian users). The L1 channel also has modulated upon it a PN code commonly called the C/A code. The C/A code runs at 1.023 MHz and repeats every millisecond. The use of PN codes on the GPS broadcast signal cause the signal's frequency spectrum to spread or widen, a phenomenon commonly called spread spectrum. This makes the signal less susceptible to jamming. It also allows GPS satellites to use the same transmission frequencies (L1 and L2), but different PN codes, a communication technique commonly referred to as code division multiple access (CDMA). Most importantly, however, the PN codes provide a means to extract timing information from the signal.

In acquiring the PN sequence for subsequent tracking, a replica of the broadcast PN sequence (See FIG. 2) is produced by the tracking hardware (any PN sequence generated by the GPS receiver's tracking hardware, as opposed to the GPS satellite, is referred to as a PN model or PN reference). This PN model is then swept through time until it aligns with the incoming signal. Alignment is determined by cross-correlating the model of the PN sequence with the measured signal.

In order to track pseudorandom (PN) sequences in a GPS receiver, a delay-lock-loop is often used that employs an early-minus-late (E-L) model of the incoming GPS PN sequence. That is, two replicas of the incoming PN sequence are produced, whereby one is then shifted ½chip early and the other shifted ½ chip late in time. The resulting late code sequence is subtracted from the early seqeunce. The prompt, (the on-time sequence as shown in FIG. 5A), represents the signal that we wish to track. A correlation function is defined as depicted in FIG. 3, such that the prompt is the reference and is held stationary. When the signal arrives earlier than prompt, its resulting correlation function is shifted to the right (delayed) since the signal must be delayed before it aligns with prompt. When the signal arrives later than prompt, its correlation function is shifted to the left since it must advance to align with prompt. The early-minus-late correlation pattern effectively provides the tracking software an error feedback that drives the PN phase generator to track the prompt. This error is known as the discriminator of the delay-lock-loop.

When the incoming signal arrives early with respect to the model, more energy is present in the early correlation result and a positive error is produced. The positive error advances the reference phase and the PN (E-L) model moves earlier in time. A negative error arises when the incoming signal arrives later and more energy shows up in the late sequence. This delays the reference phase. The error continuously drives the delay-lock-loop, which thereby adjusts the reference phase generator to maintain zero phase error. In a GPS application, the prompt signal is the digitally sample (received) signal corrupted by noise, multipath and filter rounding. Multipath signals can cause errors in the prompt and thereby result in a shifted reference. A shifted reference causes the delay-lock loop to produce an erroneous code phase. Therefore, what is need in the art is a method to mitigate erroneous effects due to multipath signals.

SUMMARY OF THE INVENTION

Disclosed herein in an exemplary embodiment is a method of measuring the phase of a pseudorandom (PN) sequence of chips, each chip having a polarity that is either positive or negative, and having a time duration, $T_{chip}$. The method comprises: generating a reference model exhibiting a reference phase, the reference phase adjustable to facilitate alignment with the phase of the pseudorandom sequence; establishing a plurality of pulsed-windows over which a plurality of samples of the pseudorandom sequence are collected for a selected accumulation interval; and accumulating the plurality of samples for each pulsed-window of the plurality of pulsed windows to form a plurality of accumulated sums. The method also includes: compensating each accumulated sum to form at least one compensated sum, if a number of level transitions and non-transitions of the pseudorandom sequence is not equal; and combining the compensated sum to determine a phase error from the plurality of compensated sums, the phase error corresponding to a phase difference between the reference phase and the phase of the pseudorandom sequence.

Disclosed herein in another exemplary embodiment is a method of measuring the phase of a pseudorandom (PN) sequence of chips, each chip having a polarity that is either positive or negative, and having a time duration, $T_{chip}$. The method includes: generating a reference model exhibiting a reference phase, the reference phase adjustable to facilitate alignment with the phase of the pseudorandom sequence; establishing a pulsed-window over which a plurality of samples of the pseudorandom sequence are collected for a selected accumulation interval; and accumulating the plurality of samples for each pulsed-window to form at least one accumulated sum. The method also includes: combining the at least one accumulated sum to determine a phase error, the phase error corresponding to a phase difference between the reference phase and the phase of the pseudorandom sequence; and normalizing the phase error by dividing the at least one accumulated sum, by a second summation taken only over pulsed windows that are based on a number of polarity transitions of the pseudorandom sequence.

Also disclosed herein in yet another exemplary embodiment is a storage medium encoded with a machine-readable computer program code for measuring the phase of a pseudorandom (PN) sequence of chips, each chip having a polarity that is either positive or negative, and having a time duration, $T_{chip}$, said storage medium including instructions for causing controller to implement the abovementioned method.

Further disclosed herein in an exemplary embodiment is a computer data signal embodied in a carrier wave for measuring the phase of a pseudorandom (PN) sequence of chips, each chip having a polarity that is either positive or negative, and having a time duration, $T_{chip}$, said data signal comprising code configured to cause a controller to implement the abovementioned method.

BRIEF DESCRIPTION OF THE DRAWINGS

FIG. 15 is a table indicating total numbers of polarity transitions and non-transitions with the 1023 chip C/A code of GPS;

FIGS. 16A and 16B depict illustrative dimensions of a window centered near a polarity transition in a PN code for a Low-to-High (L-H) transition and a High-to-Low (H-L) transition respectively;

FIGS. 17A, 17B, and 17C depict an illustrative PN code, a windowed sampling thereof, and sign corrected samples thereof;

DESCRIPTION OF THE EXEMPLARY EMBODIMENTS

Figure 1:
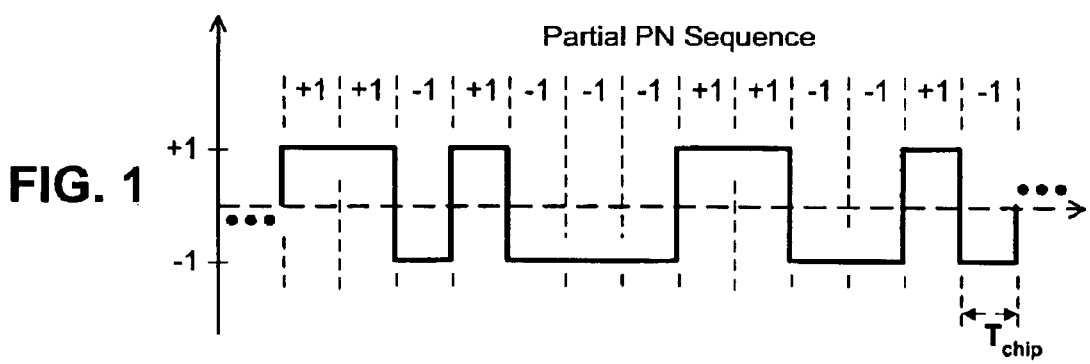
FIG. 1 shows a portion of a pseudorandom noise (PN) sequence.
Figure 2:
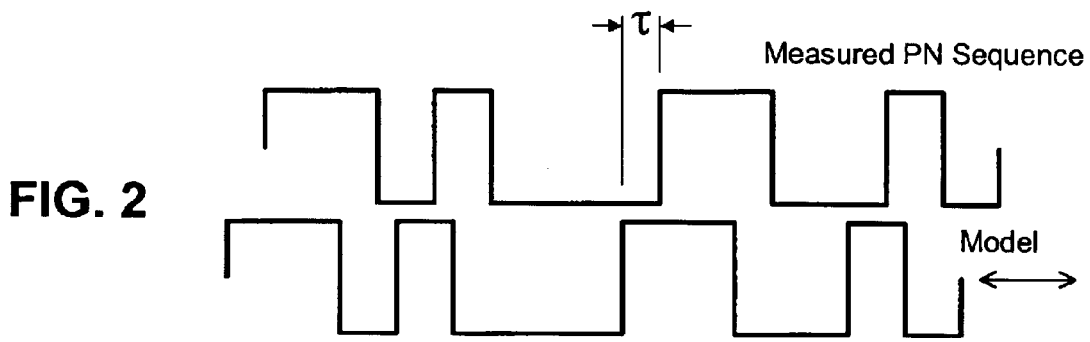
FIG. 2 shows the process of aligning a model PN sequence with a measured PN sequence. Both sequences are identical other than a time misalignment.
Figure 3:
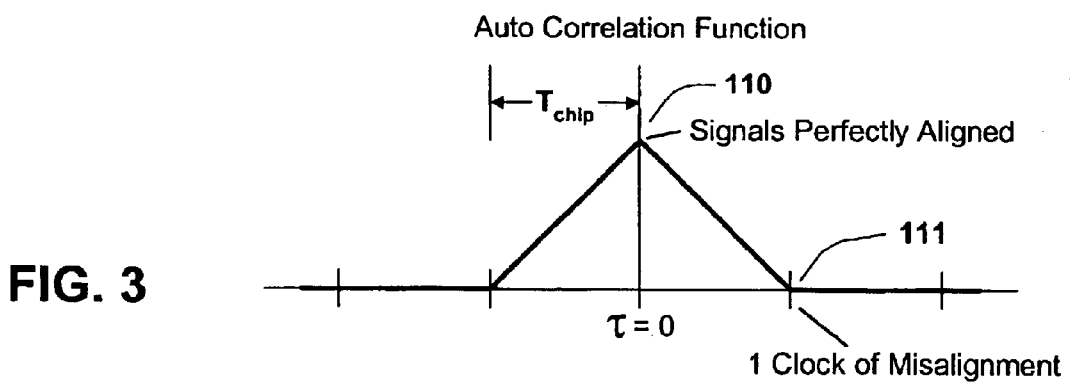
FIG. 3 depicts an autocorrelation function that results when two similar PN sequences are correlated with one another.

A PN code tracker must be able to "reject" the multipath signals to the best extent that is possible while still track the desired direct PN signal. The direct signal contains the needed timing information that ultimately allows the receiver to compute its location.

Disclosed herein is a new method and system to ascertain a code phase error directly, rather than necessarily trying to simply drive it to zero with a track loop. Summations are still taken over one or more periodically occurring windows, the size and placing of which are tailored to reduce the effects of multipath. Furthermore, a second additional summation is taken of absolute values of signal samples over windows centered near chip polarity transitions. This second summation is an advantageous property of an exemplary embodiment that facilitates normalization. Dividing the first set of summations by the additional summation and multiplying by a constant related to the window size leads to a measurement of actual phase misalignment between the received PN sequence phase and the reference phase. This measurement of phase misalignment drives a control loop that keeps the reference phase aligned with the phase of the received signal.

Second, windows are placed asymmetrically with respect to chip clock transitions and such placement results in an asymmetric phase error curve. This asymmetric phase error curve is beneficial for reducing the adverse effects of multipath. When employing an embodiment of the present invention, the measured-verses-true phase error curve is of unit slope for small displacements of phase error, but becomes saturated at a constant positive value to the right (lagging reference phase) and becomes zero in a region to the left (leading reference phase). The benefits of the asymmetric error function will become more apparent with the disclosure herein. Advantageously, the asymmetric error function is less likely to break lock, relative to existing discriminators. As a related benefit, the asymmetric error curve is less likely to result in inadvertent tracks of a multipath signal rather than the direct PN signal. Tracking multipath would mean that the reference phase was aligned closely with a multipath signal.

Also disclosed herein is a method whereby phase biases are eliminated from the asymmetric phase error function by performing additional computations when accumulating the phase error to address a disparity in the number of polarity transitions (zero-crossings) as non-polarity transitions on the clock edges (integer phase values) of the PN sequence.

In the discussion that follows, it is assumed that the conventional methods of down converting a GPS signal to base-band and conventional digital tracking hardware for tracking phase in phase-lock-loop (PLL) are already in place (usually using a phase tracking loop called a Costas loop is utilized). Concentration is on PN tracking and not the tracking of the signal's carrier. It should be appreciated that carrier tracking occurs simultaneously with PN tracking, however, it is well known and not pertinent to the understanding of the concepts that of this disclosure.

Figure 4:
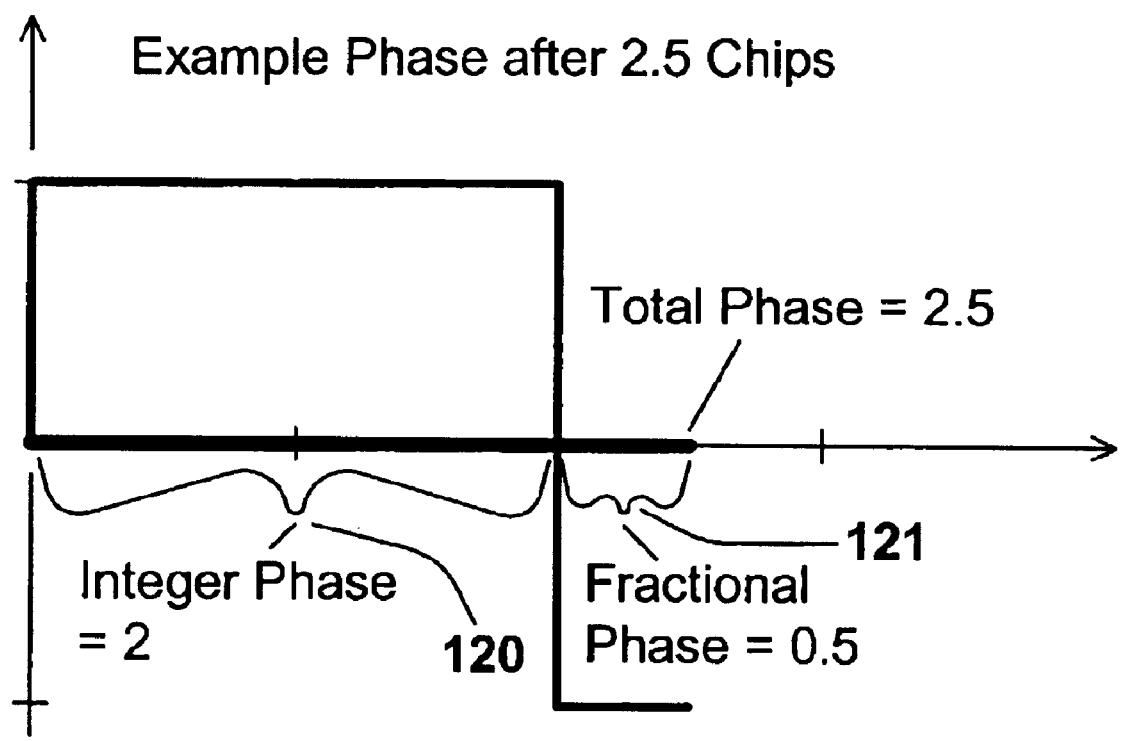
FIG. 4 is an example showing the relationship of the phase of a PN sequence to the chips of the PN sequence.

To steer the chip transitions with respect to time the clocking of the model PN generator is manipulated. As shown in FIG. 4, a reference PN phase counter consisting of two parts: an integer phase 120 and a fractional phase 121, is used for this purpose. Both the integer and fractional phase define the total phase of the PN model. A delta-phase, or code phase error is usually computed/tracked by a tracking loop and is added to the fractional phase every sample clock period or at some other prescribed rate. The continuing accumulation in the fractional phase due to this delta-phase addition eventually causes the fractional part to exceed one. At this instant, the integer phase is incremented, and an integer's worth of phase removed from the fractional phase. An integer phase of zero represents the starting chip of the sequence, and each near integer is the next chip in the sequence. The integer count continues until the sequence is exhausted (1023 chips in the case of a C/A code) at which point the phase resets back to zero.

Figure 5A:
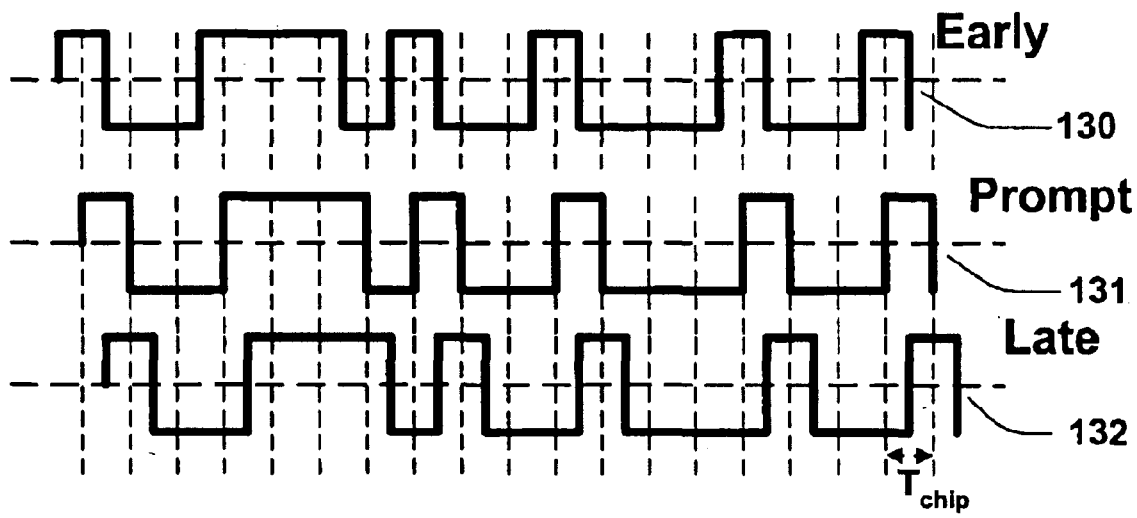
FIG. 5A presents three PN sequences of similar type and composition, but with alignments designated as prompt, early and late.
Figure 5B:
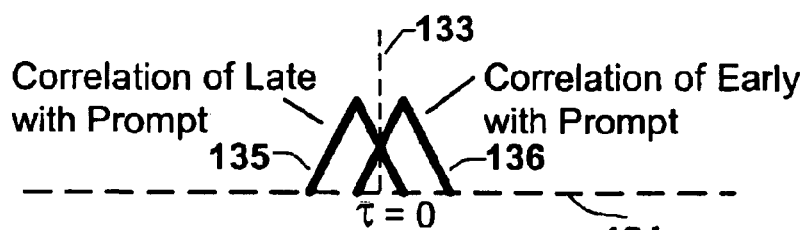
FIG. 5B presents the autocorrelation functions of the early and late PN sequences with the prompt PN sequence.
Figure 5C:
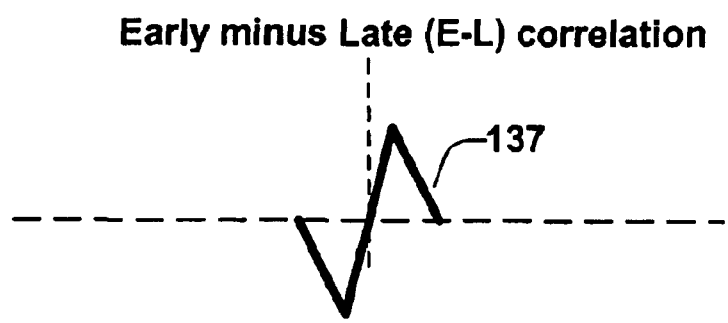
FIG. 5C depicts the correlation of the difference of a late PN sequence from early PN sequences (E-L sequence) with the prompt PN sequence.

In order to track pseudorandom (PN) sequences in a GPS receiver, a delay-lock-loop is often used that employs an early-minus-late (E-L) model of the incoming GPS PN sequence. That is, two exact replicas of the incoming PN sequence are produced, whereby one is then shifted ½ chip early and the other shifted ½ chip late in time. The resulting late code sequence is subtracted from the early sequence. FIG. 5A shows the ½ chip early sequence 130, a prompt 131, (or on-time sequence), and a ½ chip late sequence 132. The prompt, in this case, represents the signal that we wish to track. FIG. 5B shows the correlation of the both the early and late sequences with the prompt sequence and FIG. 5C shows the correlation of early-minus-late sequence with the prompt. The correlation function is defined such that prompt 131 is the reference and is held stationary. The axis 134 is such that a delay in time alignment $\tau$, is considered positive and to the right. When the signal arrives earlier than prompt, its resulting correlation function 136 is shifted to the right since the signal must be delayed before it aligns with prompt. When the signal arrives later than prompt, its correlation function 135 is shifted to the left since it must advance to align with prompt. Note that the early-minus-late correlation function 137 crosses zero $\tau=0$, 133. That is, when early and late codes are balanced ½ chip on either side of a prompt code. The early-minus-late correlation pattern effectively provides the tracking software an error feedback that drives the PN phase generator to track the prompt. This error is known as the discriminator of the delay-lock-loop.

When the incoming signal arrives early with respect to the model, more energy is present in the early correlation result and a positive error is produced. The positive error advances the reference phase and the PN (E-L) model moves earlier in time. A negative error arises when the incoming signal arrives late and more energy shows up in the late sequence. This delays the reference phase. The error continuously drives the delay-lock-loop, which thereby adjusts the reference phase generator to maintain zero phase error. In a GPS application, the prompt signal is the digitally sampled (received) signal corrupted by noise, multipath and filter rounding.

It is instructive to look a little closer at the E-L PN sequence and how it correlates with the prompt PN sequence. Consider FIG. 6, which shows several chips 140 from a prompt PN sequence with each chip having a time-duration of $T_{chip}$. Also shown is an E-L sequence, 141, properly aligned in phase with the prompt sequence, and the product 142 of the prompt sequence and E-L sequence. Note that although the prompt PN sequence takes on values of +1 and −1, the E-L sequence can take values of +2, −2, and 0. However, in practice the E-L sequence is divided by two as it is generated so that product of prompt and E-L also takes on values of +1, −1 and 0.

Figure 6:
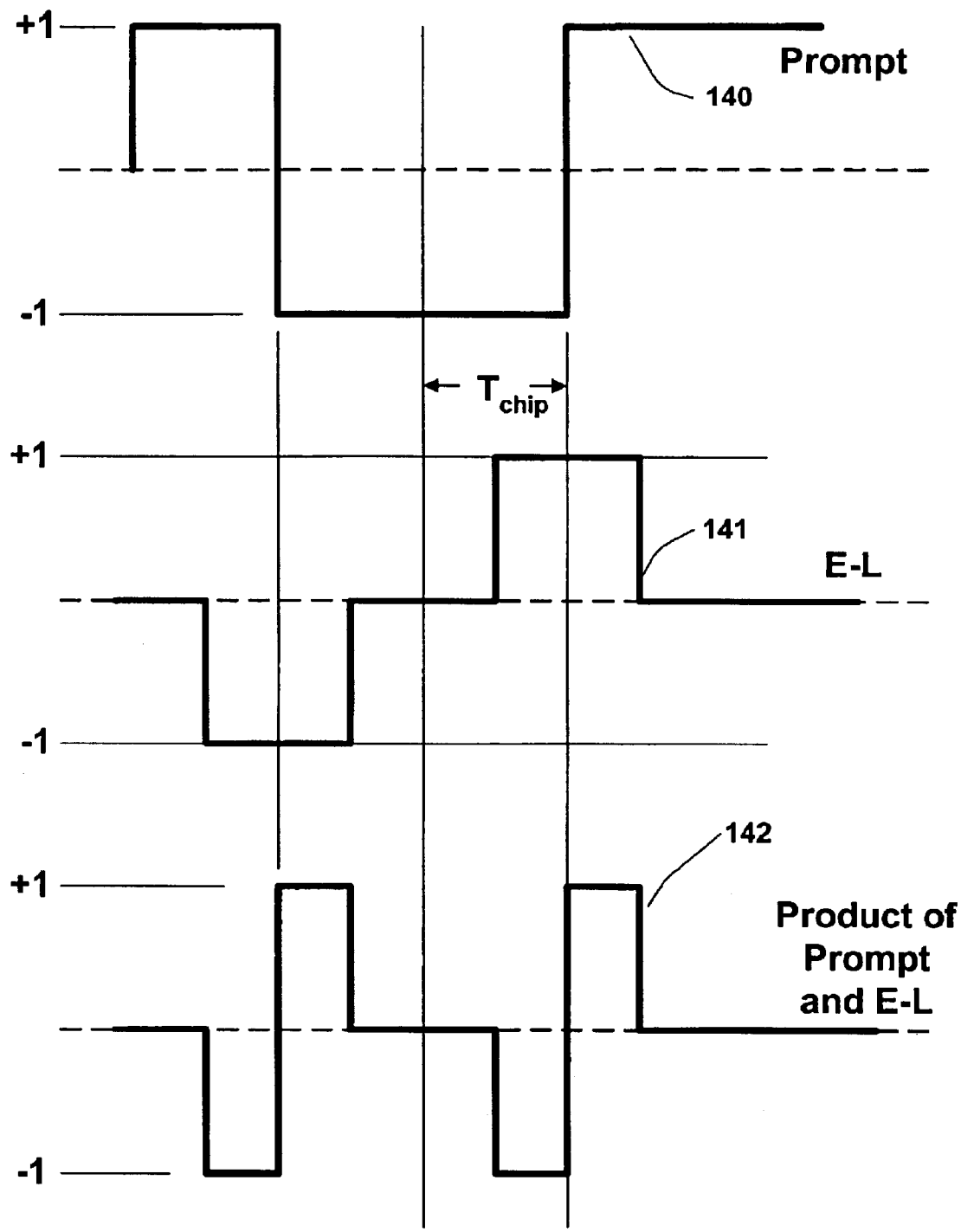
FIG. 6 shows several chips from a prompt PN sequence, several chips from a E-L sequence, and the product of the two sequences.

Notice that the E-L sequence, when aligned as in FIG. 6, is non-zero at chip level transitions of the prompt. Further, the non-zero chips of the E-L are of polarity equal to the transition of the prompt. Low-going edges of the prompt produce negative E-L chips. High-going edges produce positive chips. Clearly, looking at the product, the average value is zero if averaged across time. This is exactly what the hardware accumulator does; after forming the product of E-L and prompt, it sums (or integrates) the product over a period of time (often 1 to 20 ms for C/A code) called the accumulation interval. When E-L and prompt are aligned, the summation is zero. Another way to view this is that the E-L chips exactly straddle the chip transitions of the prompt signal. Thus, the area of the left-hand side of the prompt's transition exactly cancels the area on the right hand side of the prompt's transition. If the E-L signal shifts left (e.g., delayed) or shifts right (e.g., advanced), the right-hand and left-hand areas in the product of E-L and prompt are unbalanced, and a track error results. In subsequent discussion, the E-L sequence will be viewed as a series of "windows". These windows correspond with the non-zero portions of the sequence and each window is centered on the prompt's code transition when properly aligned and tracking.

Figures 7A, 7B, 7C:
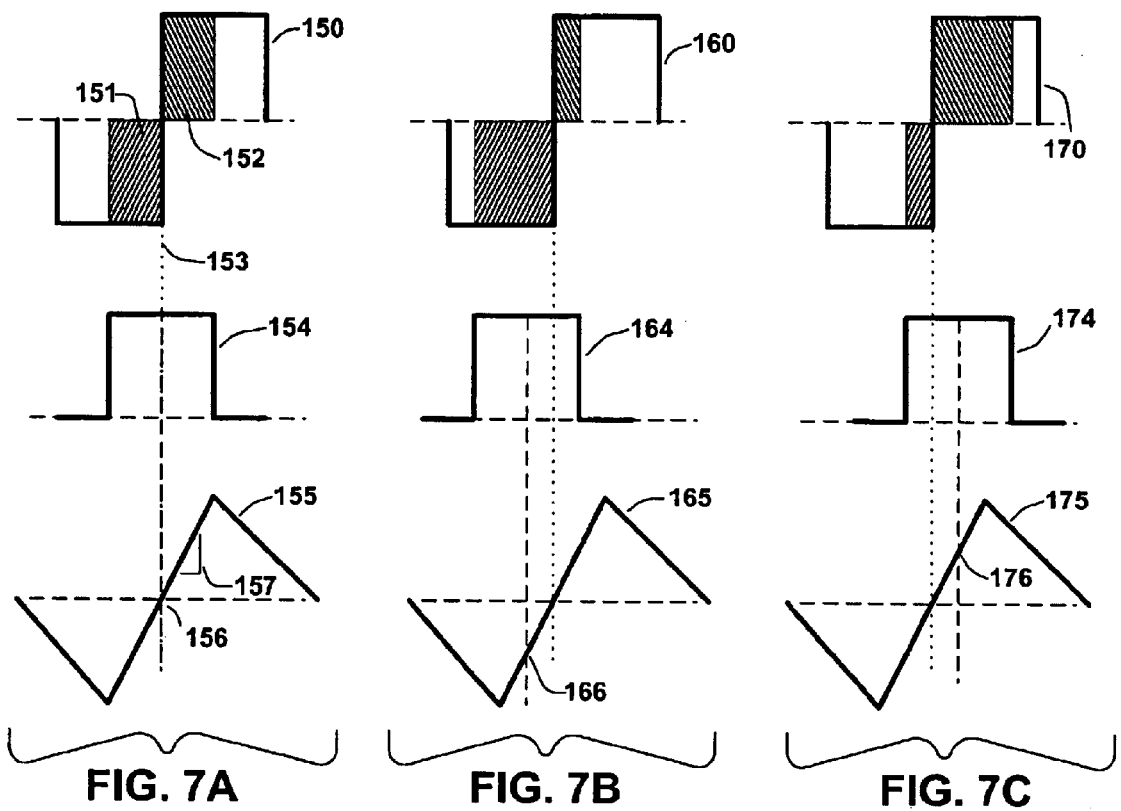
FIG. 7A depicts an E-L properly aligned with the PN transition.
FIG. 7B depicts an E-L arriving early and the resulting negative error.
FIG. 7C depicts an E-L arriving late and the result positive error.

Using the notation of "windows" centered about the chip transitions, consider the correlation of one E-L code window with a signal transition of the incoming code. This is shown in FIGS. 7A–7C for three different alignment scenarios: prompt, early model, and late model respectively. The top-most diagram in each scenario depicts two chips of incoming code (150, 160, 170) with a polarity transition 153 between the chips, the diagrams below show the E-L code windows (154, 164, 174) for each scenario, and the bottom diagrams show the resulting correlation functions (155, 165, 175).

Referring now to FIG. 7A, the E-L window 154 is centered on the code transition 153 and the area on the right 152 balances the area on the left 151. Consequently, when the product of incoming code with E-L window is formed, the areas sum to zero. The correlation function 155 crosses zero where this occurs 156. The slope 157 of the correlation function shows how the correlation changes as a result of the misalignment. The slope is proportional to the rate at which area is added and subtracted due to shifting the E-L code window. The window 164 shifts to the left, as shown in FIG. 7B, when the phase of the tracker is advanced in time with respect to the incoming signal. In this case, the resulting correlation is negative 166 and this negative error is fed back to the tracker. This slows the phase generator of the tracker and causes a delay that re-aligns the signals. The opposite occurs as the window 174 is moved right in FIG. 7C. Here the correlation is depicted as positive 176.

Figures 8A, 8B, 8C:
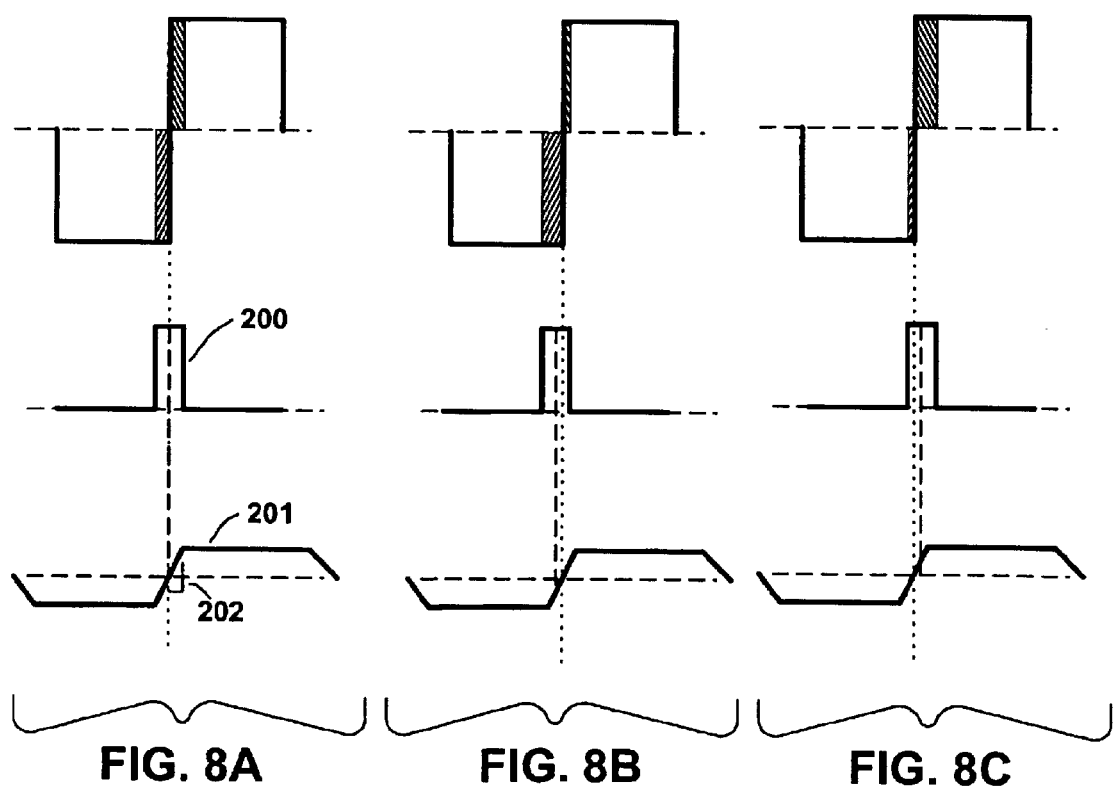
FIGS. 8A, 8B, and 8C depict a similar situation as in FIGS. 7A, 7B, and 7C, respectively, however, with the E-L pulse narrowed to less than one chip width.

Ideally, the code tracker is configured to keep the window centered and consequently, only the slope of the correlation function near the zero crossing is of significance while maintaining track. This means that once a stable track is obtained, the window may be narrowed, if desired, as depicted in FIGS. 8A–8C. The slope 202 of the correlation functions on the bottom row of FIGS. 8A–8C is the same as those of FIGS. 7A–7C, but in FIG. 8A–8C we see that the correlation function 201 flattens on the top and bottom. The slope is the same because the narrower window "picks up area" at the same rate as the wider window as it is slid across the edge of the code-transition.

Narrowing the window as described has commonly become known as "Narrow Correlation". One advantage of narrow correlation is that is improves the Signal to Noise Ratio (SNR) of tracking. It will be appreciated that in an actual receiver, the incoming signal may be corrupted with noise. In tracking, it is the edge transitions that are important. By narrowing the amount of data gathered away from the edges, we essentially eliminate data that is not providing additional information, but which is adding noise to the tracking discriminator.

The problem with E-L discriminators, and even the Narrow Correlation E-L discriminators, is that they are affected by reflected signals from nearby objects, these reflections known as multipath (i.e., the signal travels multiple paths to get to the receiver, the direct path and via the paths that result from reflections off objects nearby). When multipath is present, there is more than one PN signal arriving: the desired direct signal and one or more reflected signals. The reflected signals always arrive late with respect to the direct signal.

The reflected signals are typically weaker than the direct signal. Furthermore, the arriving reflected signals are sometimes reversed in polarity to the direct signal. This due to: 1) the reflection flips the phase 180 degrees, and 2) the phase of the carrier varies with path distance. For every 19 cm of path difference, the wavelength of the L1's carrier, the phase will rotate through 360 degrees when track C/A code for example. The multipath can arrive at any phase between 0° and 360° with respect to the direct signal. The "I" and "Q" channels that feed a typical Costas carrier-tracking-loop will see the polarity of the multipath PN sequence flipped whenever its carrier phase is more than 90 degrees offset from the direct signal.

Figure 9A:
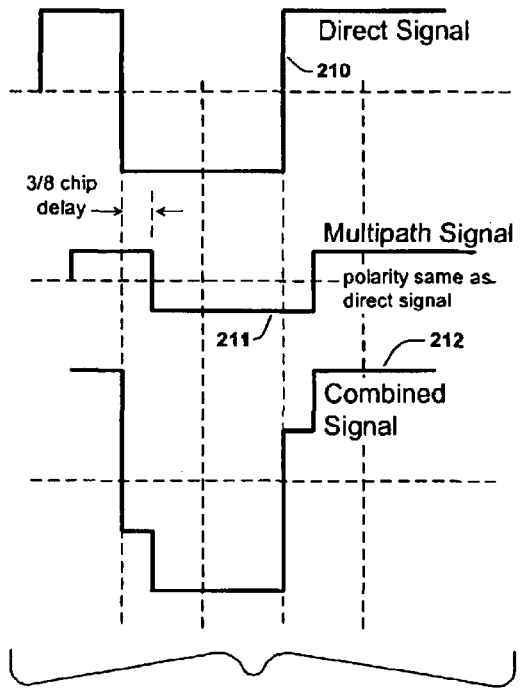
FIGS. 9A and 9B depict illustrative multipath delayed with respect to the direct signal and the combination with the direct signal to form a composite signal.
Figure 9B:
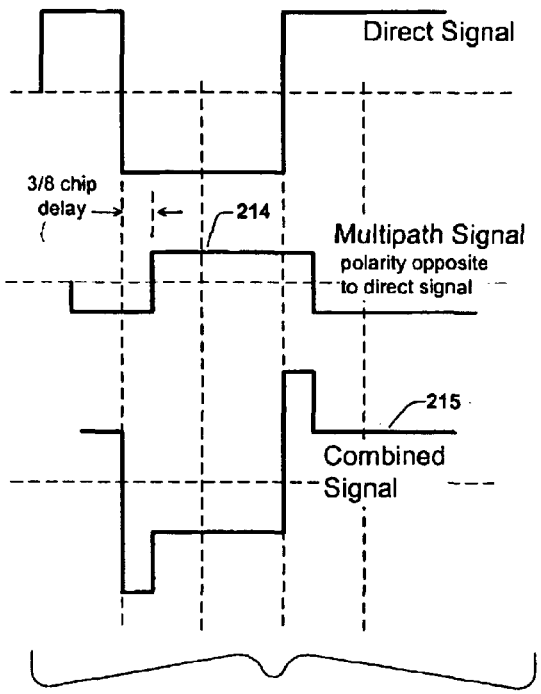

FIG. 9A shows an example of both a direct 210 and a reflected (multipath) signal. In this figure, the reflected signal 211 exhibits the same polarity as the direct signal but is delayed by $\frac{3}{8}$ of a chip and exhibits $\frac{3}{8}^{th}$ of the amplitude as well. The combined direct and reflected signal 212 is shown at the bottom of the figure. FIG. 9B shows a similar situation, however, the reflected signal 214 is opposite polarity to the direct signal. For clarity, we show only one reflected signal in each figure, however, in practice, there are often multiple reflected signals arriving at varying delays, amplitudes, and polarities. The discussion presented herein easily extends to multiple reflected signals.

Figure 10A:
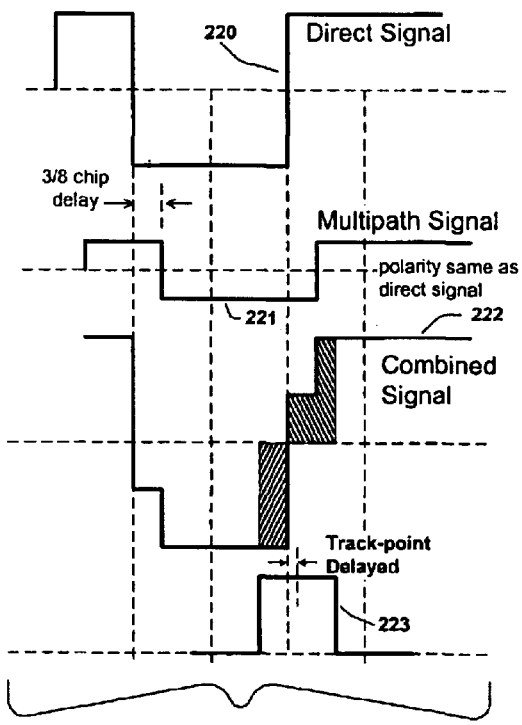
FIGS. 10A and 10B depict how the multipath introduces a bias into the track point of the direct signal, causing a non-zero phase error.
Figure 10B:
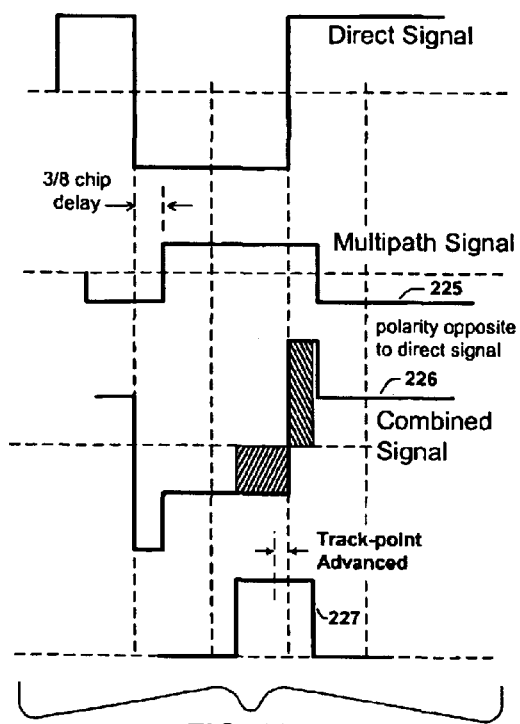

Now consider the impact of a signal that contains multipath on an E-L discriminator. As shown in FIG. 10, the E-L window 223 must still balance the area on the right and left hand sides. However, this causes the E-L window 223 to be delayed with respect to the direct signal when the multipath 221 is the same polarity as the direct signal. The E-L window, 227, advances from the direct signal when multipath 225 is of opposite polarity to the direct signal.

What can readily be observed is that due to the shape of the combined signal, the effect of multipath that is opposite polarity to the direct signal is more pronounced than the effect of multipath of the same polarity as the direct signal. That is, the advance caused by reversed-polarity multipath is larger than the delay caused by multipath of the same polarity as the direct signal, assuming the multipath is identical except for its polarity.

Figures 11A, 11B:
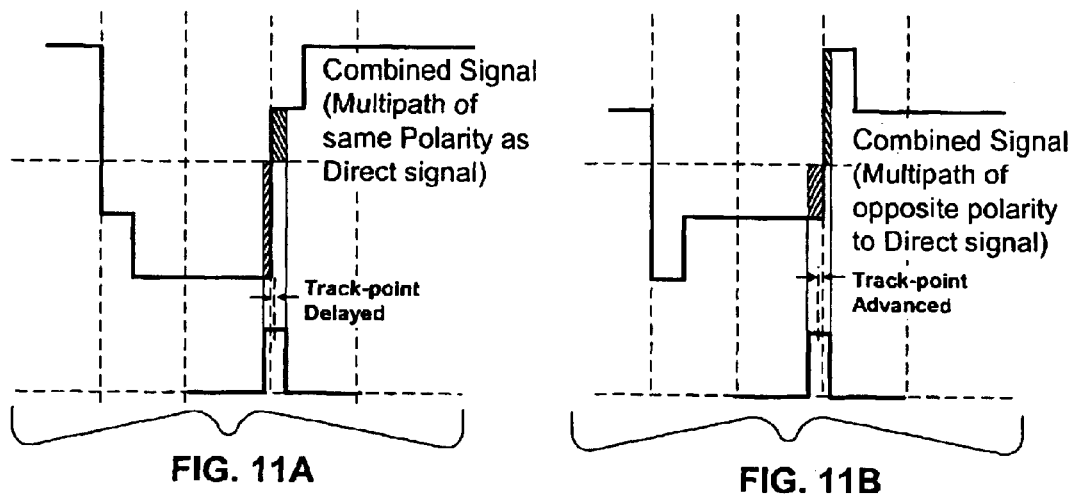
FIGS. 11A and 11B show how a narrow pulse window (narrow correlation) reduces the multipath-induced error.

Narrow correlation provides some performance improvement. Consider FIGS. 11A and 11B, in this instance, the largest error caused by the multipath cannot exceed ½ the window width of the narrow correlator. Narrow correlation is impacted by multipath and is not much better than a conventional E-L correlator for multipath that is from nearby reflection points.

Figures 12A, 12B:
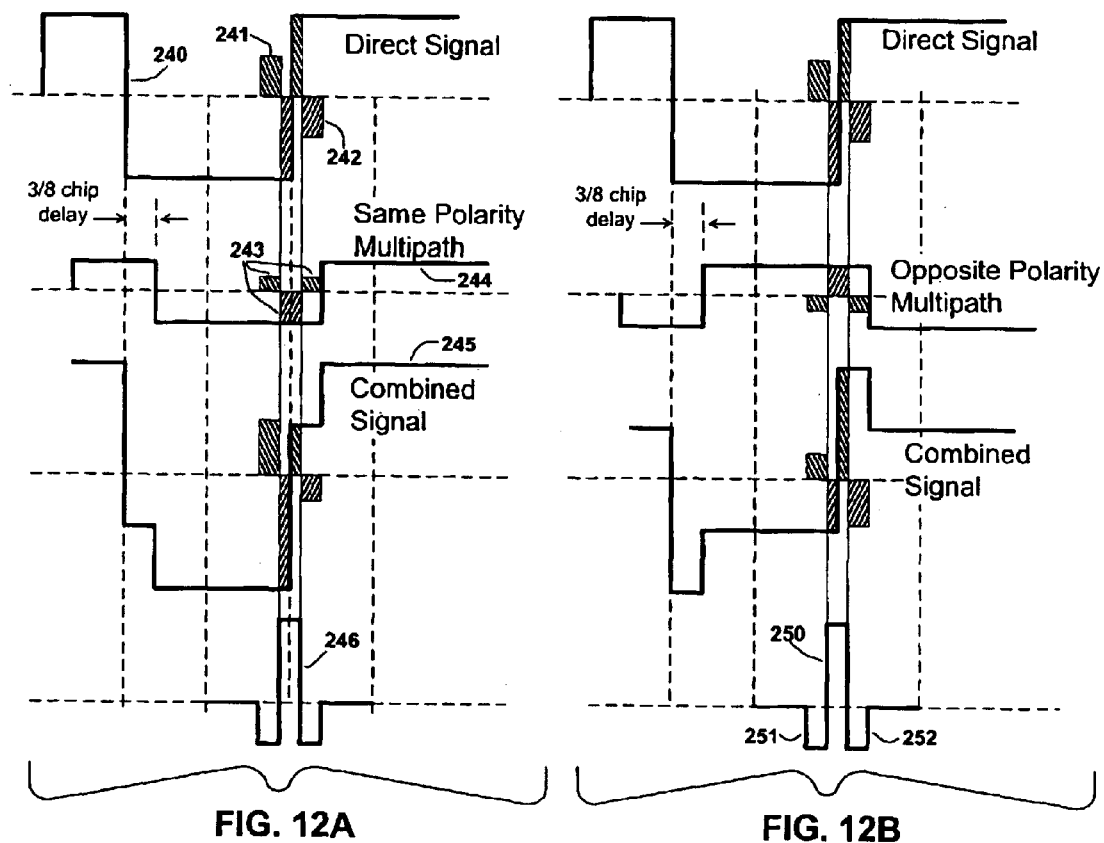
FIGS. 12A and 12B show how a W-discriminator can reduce the multipath induced error for multipath of sufficient delay with respect to direct signal.

The utilization of a narrow window may readily be taken one step further. In one instance, a different shaped window, known as a W-discriminator is discussed. Employing a discriminator with this window shape will eliminate the error introduced by multipath completely, provided the time-delay of the multipath signal is sufficiently large that the code transitions in the multipath lie beyond the boundary of the window. FIG. 12 shows a W-discriminator window waveform 246. Note that the window is essentially an even symmetric narrow correlation type window with two side lobes of opposite polarity to the main window at ½ the amplitude. The side lobes 251 and 252 are situated on either side of the main window 250.

It may readily be appreciated that rather than trying to analyze the combined signal 245, it is beneficial to analyze the direct signal 240 and reflected multipath signal 244 separately. Clearly, the W-discriminator's area 243 averages to zero and, as such, its product with a constant waveform will average to zero as well. When the multipath 244 is sufficiently delayed, as it is depicted in FIG. 12, the multipath appears constant over the extent of the W-discriminator window. Consequently, the multipath has no effect on the average value of the correlation. Analyzing the direct signal 240 it may be seen that the lobes of the window are such that the product of the lobes with the direct signal has area 241 and area 242 of equal size and opposite sign. This holds true for shifts of up to ½ the width of the main window 250 of the W-discriminator. So there is no impact of the side lobes on the direct signal when the W-discriminator window is nearly centered with the code transitions. This leaves the main window, which has an effect similar to narrow correlation on the direct signal. That is, shifts to the left or right cause increasing or decreasing area in the correlation. Therefore, the W-discriminator is a narrow correlation type discriminator that is immune to a sufficiently delayed multipath.

Therefore, it may also be appreciated that the drawbacks of the W-discriminator include: First, it is easier to lose lock, since the W-discriminator pattern goes to zero after relatively narrow windows on either side of the discriminator function. Furthermore, this zeroing of the discriminator makes it possible that the control loop would zero out the direct sequence and thereby, track the multipath. Second, the W-discriminator includes added side lobes that are not present, in a narrow correlator, the additional window area results in more noise being picked up in the correlation process. Since all information needed for accurate tracking is in the code transitions of the incoming PN signal, any extra regions that are added to the correlator introduce noise, but no additional information.

An even more generalized version of the windows needed for tracking with reduced multipath are known as Multipath Mitigation Windows (MMWs). They generalize to include the W-discriminator window, but take into account additional window shapes. Here, asymmetric windows are introduced that have the potential to be narrower than the blanked PRN window since they are less likely to lose lock.

Figure 13:
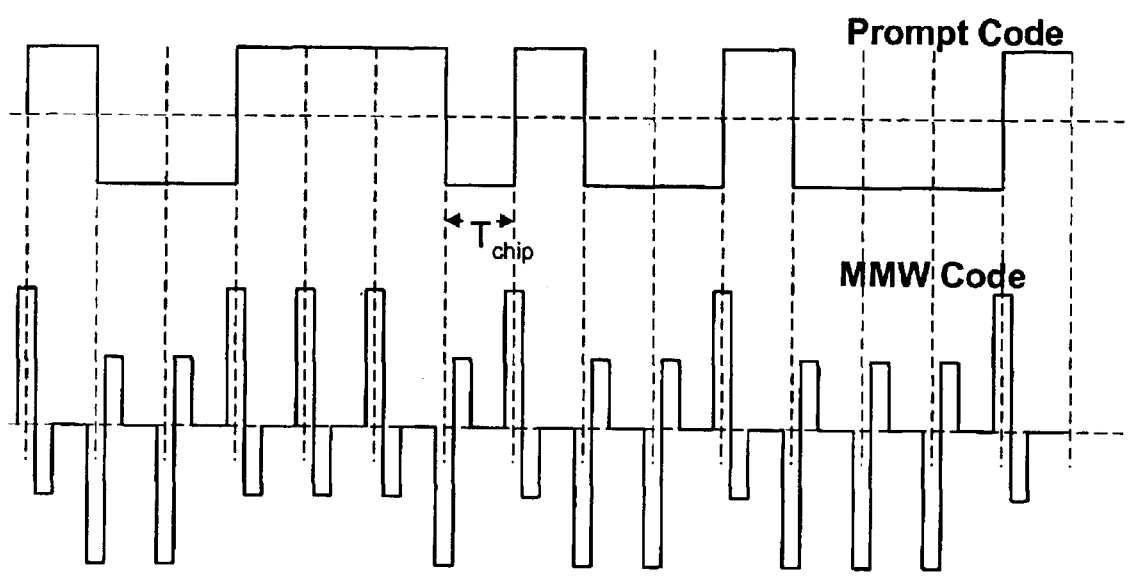
FIG. 13 is an example of the multipath-mitigation windows.

The MMW windows are formed from combinations of the original PRN code, where these combinations are shifted in time, scaled in sign and amplitude, and then only regions near the edge transitions are utilized. Due to the fact that the windows are sometimes asymmetric in nature, they no longer balance across a single chip transition and you must consider the entire sequence of chips over which the correlation takes place. This windowing strategy assumes that there are roughly as many transitions as non-transitions in the C/A code signal and that asymmetric windows can balance transitions with non-transitions. This results in a MMW that are shaped like FIG. 13, for example.

Unfortunately, asymmetric windows may introduce a tracking bias because there is not an exact balance of transitions with non-transitions. Transitions in the C/A code can differ from non-transitions by as much as 65 (see FIG. 15) out of sequence length of 1023 chips. Moreover, asymmetric MMW windows are placed at all clock edges of the code, not just where the transitions take place. This adds noise and may degrade tracking performance.

Figure 14:
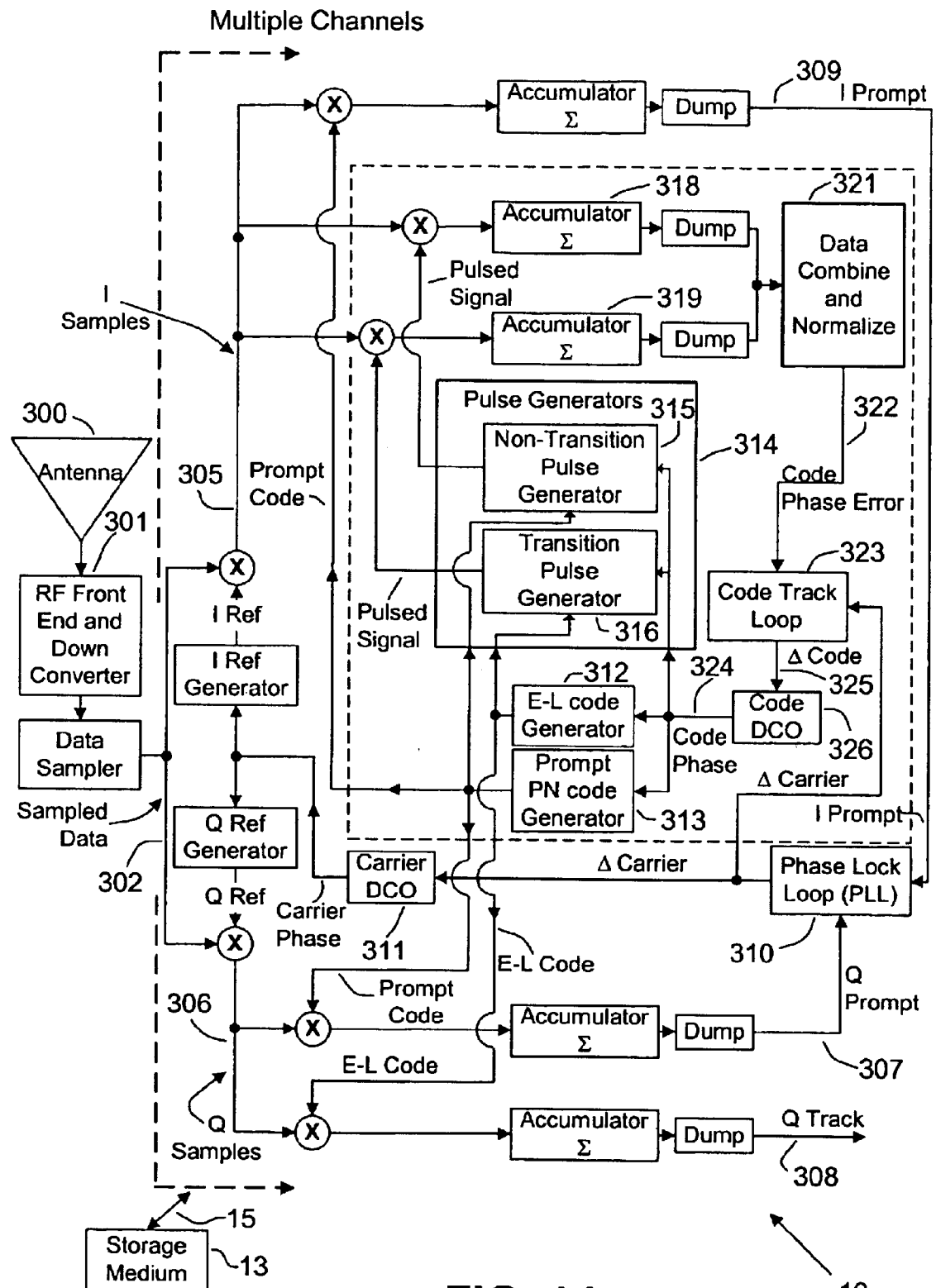
FIG. 14 is a block diagram depicting a portion of a GPS receiver involved in tracking a PN encoded signal representing in accordance with an exemplary embodiment.

Referring to FIG. 14, a block diagram is shown representing a portion of a GPS receiver 10 in accordance with an exemplary embodiment. The PN encoded signals from a plurality of GPS satellites are received by an antenna 300, and then supplied to an RF Front End and Down Converter. Down converted data is digitally sampled, the sampled data 302 of which is supplied to multiple GPS processing channels. FIG. 14 depicts one such channel, all of which perform a similar function. For simplicity, additional paths of processing that are sometimes included in advanced GPS receivers are omitted from FIG. 14. The block diagram, as shown, pertains to processing of the L1 signal component of GPS, although the inventions disclosed herein readily apply to both L1 and L2 GPS signals and even other Navigation satellites such as the proposed Galileo system. For each channel, an I-reference generator 303 generates an "in-phase" signal that is the same frequency and phase as the carrier component of the sampled data. A Q-reference generator 304 produces a "quadrature-phase" signal that is ninety degrees out-of-phase to the carrier component. Both the I and the Q reference signals multiply the incoming data samples for the purpose of removing the carrier component. In an exemplary embodiment, focus in one the I-channel 305 by way of illustration since when the receiver is phase-locked, most of the signal energy is in the I-channel. It should be appreciated of course, that this is not considered a limitation, however. The embodiments disclosed herein are equally applicable to the Q-channel, and to combinations of I- and Q-channels. The Q-channel, 306, is shown for completeness. The Q-channel accumulates and dumps periodically a Q-prompt signal 307. This Q-prompt signal is processed by a Phase-Lock-Loop (PLL) 310 that drives a Carrier DCO 311 to maintain phase-lock on the carrier of the incoming data stream. Also shown is a Q-track signal 308 (shown un-connected) that is used primarily for control loop "pull-in" prior to obtaining phase lock. In addition, FIG. 14 depicts an I-prompt signal 309 that aids the PLL by providing the proper sign to the Q-prompt signal, a step that is employed to address half-cycle phase ambiguity. One such PLL that operates with a half-cycle phase ambiguity is commonly known as a Costas loop. The receiver 10, in subsequent processing of the I-prompt signal, extracts navigation data that has been modulated on the GPS broadcast signal and that contains relevant information such as the location of the GPS satellites.

The I-channel includes, but is not limited to, a PN encoded signal that is to be tracked. In an exemplary embodiment, tracking this PN encoded signal is accomplished by measuring a phase alignment error between the phase of the received PN signal and a locally generated reference phase 324 utilizing an approach that yields a true measure of the tracking error. An E-L code generator, 312, and a prompt code generator, 313, are employed, but serving different purposes from their conventional application. In an exemplary embodiment, the Prompt and E-L codes from these code generators are supplied to pulsed-signal generators within block 314. This aids in the purpose of selecting proper pulse windows from a set of pulse generators 315, 316 and further facilitates the determination of the polarity of such pulses. It will be appreciated that although two pulse generators are shown for illustration of an exemplary embodiment, other implementations including fewer or a greater number of pulse generators is possible. The pulsed signals are then multiplied by the I-channel data and fed to a set of accumulators, 318, and 319. The accumulators provide running sums of the pulse-multiplied data, which is dumped periodically (for example every millisecond) to another processing block 321. The processing block 321 combines the accumulated data and normalizes it to produce a code phase error 322. One feature of the normalization process disclosed herein 321 is that the accumulated data is scaled to remove biases that would otherwise occur in the code phase error 322 due to the asymmetric approach taken when forming this error. The code phase error 322 is supplied to a Code Track Loop, 323, the purpose of which is to provide delta-code values 325 that are summed within a code DCO 326. The end result is that the reference code phase 324 is kept synchronous with the code phase of a PN sequence received from a GPS satellite and which is present in the I-channel 305. The reference code phase 324 is required when forming a pseudo-range, as is commonly known in the art, and this pseudo-range, when processed together with pseudo-ranges from the plurality of tracked GPS satellites, allows the location of the receiver to be determined. Furthermore, achieving synchronous reference code phase facilitates alignment of a PN model with the actual PN signal. Such alignment is also utilized for further, well-known aspects of GPS data processing including, but not limited to, data-demodulation, carrier phase tracking, and signal strength monitoring.

The reference code phase 324 is steered by a conventional feedback control loop 323 in such a manner that it remains aligned with the received PN code phase. The control loop is driven by a code phase error term 322. The code phase error term 322 is an estimate of the phase difference between the reference code phase and the received code phase and is defined to be positive when the reference code phase lags the actual code phase, zero when the phases are aligned, and negative otherwise. This convention for the sign of the code phase error 322 is consistent with standard feedback control practice, but the sign is not important, as long as the control law is defined such that, ultimately, an observed lag in model phase results in increasing the rate of phase accumulation so that the reference code phase 324 "catches up" to the incoming actual code phase. Conversely, the reverse should occur when the reference code phase 324 is leading the incoming signal phase and the control law should slow the accumulation of reference code phase 324.

In an exemplary embodiment an unbiased, direct measure of code phase error 322 is produced that is not corrupted by multipath generated from objects in the surrounding area of the antenna 300, provided the signals are delayed sufficiently with respect to the direct signal. Such multipath can cause detrimental effects in the position accuracy of a GPS receiver 10.

It should be noted that to determine the phase of the incoming PN signal, it is necessary to measure the occurrence of some feature within the signal that provides a distinguishable mark of the signal's progression through time. It is the transitions in polarity of the PN signal that provide such a mark. Such transitions occur only on a whole integer value of the phase of the PN sequence. As stated earlier, the phase of the sequence of PN chips is a number having both a whole integer portion and a fractional portion. The whole integer portion is a count of completed chips of the PN sequence, and the fractional portion is the fraction of the chip that is in progress, either partly transmitted or received. At the beginning of each new chip, the phase, by definition, is exactly an integer value (i.e., the fractional part is zero). Once again, FIG. 4 provides an example depiction of the phase of a PN sequence after 2.5 chips of the sequence has transpired. In the example, the integer part 120 is two chips in duration and the fractional part 121, is 0.5 chips.

Locally, the receiver 10 generates a reference code phase 324 to follow the true code phase of the received sequence. If the reference code phase 324 is aligned with true code phase, it should achieve an integer value simultaneously with a chip transition of received sequence. If not aligned, there is an error in the reference code phase 324 as compared to the code phase of the received signal. As indicated, the error is used in a control loop to correct the reference code phase 324. The difference in time between incoming polarity transitions and reference phase integer values, when divided by the chip length, is the desired code phase error 322.

It is assumed that the reference code phase 324 is initially aligned to the incoming PN sequence by commonly known GPS search practices and that it is maintained by subsequent control-law feedback such that the phase error is a fraction less than one chip, and is usually significantly less than one chip. Therefore, we desire only a fractional phase error.

As a PN code is clocked out of a PN code generator, there are exactly four events that may transpire with respect to the polarity of the code across a clock boundary. The code can either change state or not, and the new polarity can be either +1 or −1. The four possibilities are defined as:

H-H Non-Transition—The code is +1 prior to the clocking of a new chip, and +1 afterwards;

L-L Non-Transition—The code is −1 prior to the clocking of a new chip; and −1 afterwards;

H-L Transition—The code is +1 prior to the clocking of a new chip, and −1 afterwards; and L-H Transition—The code is −1 prior to the clocking of a new chip, and +1 afterwards.

The table depicted in FIG. 15 provides the totals of the various clock-edge events that occur within the C/A code of GPS.

It should now be appreciated that there are only to possibilities for level transitions, the H-L and the L-H transition. FIGS. 16A and 16B depict a detailed view of one L-H transition one H-L transition for illustration. In FIG. 16A, the point in time 403 at which the reference phase becomes an integer and at which a new chip would be clocked is labeled 'C'. The nomenclature 'C' is used to indicate a centerline of the reference model's PN level transition. A window centered on 'C' and extending a distance of 'w' on each side of the centerline 'C' is shown, having left edge 401 and right edge 402. The edge of the polarity transition 408 of the sequence 405 occurs prior to the centerline 'C' so that the reference model lags the incoming signal by code phase delay 'd'. Although the transmitted sequence originates as a series of chips with levels of +1 and −1, the received signal is shown to have levels of +A and −A (407) where the amplitude 'A' is typically different from one. This is due to a variety of factors, including broadcast power level, signal attenuation, hardware processing gain etc. There is actually no loss of generality when assuming a signal level of +1 and −1, but we use +A and −A in FIGS. 16A and 16B to depict a more general and the real situation.

A code phase discriminator is developed based upon the area enclosed by the window borders 401 and 402, and the signal 405 of FIG. 16A. The convention shall be taken that a negative signal level produces a negative area and a positive signal produces a positive area. The total area bounded on top and bottom by the signal 405 and contained within the window shown spanning from 401 to 402 is thus:

$$\text{total area} = A(w+d) - A(w-d) = 2Ad \qquad (1).$$

Now consider one more computation of the area, however, this time using the absolute value of the signal. If the absolute valued of the signal is taken when computing areas, we shall refer to the area as the "absolute area".

In FIG. 16A for instance:

$$\text{absolute area} = A(w+d) + A(w-d) = 2Aw \quad (2).$$

Now, dividing the total area by the absolute area:

$$\text{total area/absolute area} = 2Ad/2Aw = d/w \quad (3).$$

The desired delay, d, is then:

$$d = w(\text{total area/absolute area}) \text{ (for L-H transitions)} \quad (4)$$

Performing the same analysis on FIG. 16B, we arrive at a similar result, except for the presence of a minus sign:

$$d = -w \text{ (total area/absolute area) (for H-L transitions)} \quad (5).$$

It may readily be appreciated then the code phase delay, d, may be computed by performing area sums and ratios about either the H-L transition or the L-H transition. In FIG. 16, a positive code phase delay, d, was depicted where d has been defined positive whenever the reference code phase lags the phase of the received sequence. When the reference code phase e.g., 324 leads the phase of the received sequence, d is negative.

Although, so far, the waveforms presented have been shown as continuous functions of time, the actual processes for these waveforms is digital (implemented in DSP, ASIC, FPGA, discrete logic or other suitable digital hardware). The hardware samples the analog signal at a constant rate but is asynchronous to the code and carrier transitions. FIG. 17 depicts the continuous and sampled waveforms for several chips of a PN code. FIG. 17A shows a continuous representation of the incoming PN code, denoted S(t). FIG. 17B shows the samples 417 of S(t) with these samples denoted S(k). As is common practice, the argument in parenthesis, 't' denotes that S(t) is a continuous function of time. The argument 'k' indicates that S(k) is sampled data taken at discrete points in time and the value of 'k' is an index associated with the discrete point. Vertical tick marks 414, on the horizontal axes depict the sample times. Samples occur at fixed intervals denoted $T_s$, 415. Samples S(k) are taken in windows 410 that span a region that encompasses the chip edge. The window center may or may not coincide with the actual chip edge. In FIG. 17 for example, the windows are depicted slightly off to the right of center of the actual chip edge. Due to the window being slightly to the right, more samples arise following (to the right of) the actual chip edge than prior to the chip edge.

It is desirable to normalize the delay, d, and remove its dependence on the transition type, H-L or L-H, as indicated in the change of sign between Eq. (4) and Eq. (5). FIG. 17C shows another signal, denoted S'(k), which is produced by performing the following logic. For each H-L transition 412, reverse the polarity of S(k) by multiplying by −1 and for each L-H transition 413 keep the existing polarity. This results in each window of data being multiplied by either +1 or −1 as shown by 418 and 419.

The sample period 415 is chosen preferably to not evenly divide the chip period 420 of the PN code. Furthermore, it is chosen not to divide evenly any N chips where N is any number ranging from one to some relative large number (usually more than several hundred). This is assured for the PN code's nominal frequency, and also for slight perturbations from the nominal frequency due to Doppler shifting arising from either satellite motion, receiver motion or receiver clock bias. When the sample period is chosen in this manner, the samples S(k) fall at different points within each of the windows 410. That is, the first point in each window, and therefore each subsequent point, will be offset relative to the edge of the window by an offset that is unique to each different window. The occurrence of samples, relative to the edge of the window, is thus treated as a statistical outcome of a uniformly distributed process.

Figure 18:
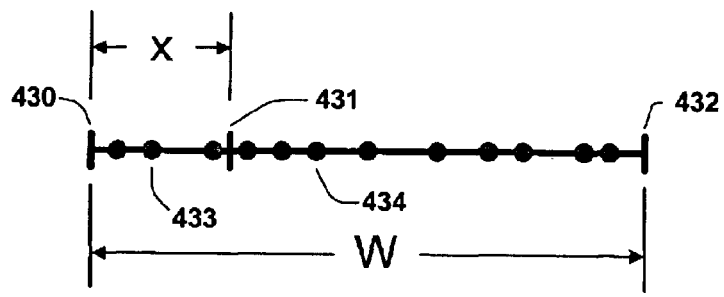
FIG. 18 depicts sample of points taken over a line segment where spacing of samples within the line segment follows a uniform distribution.

In one implementation of an exemplary embodiment, at least 512 windows worth of data are processed to generate a single estimate of code phase error. The large number of windows assures that properties relating to the statistical nature of the uniform distribution assumption can be applied in a useful manner. This is exemplified by FIG. 18. Here, a line that extends from 430 or 432 represents a window of time of duration W (W is the length of the segment). Points such as 433, 434 and 435 along the line represent sample points taken according to a uniform distribution of such points along the line. By the laws of statistics, on average, a certain fraction of the total points that lie within the entire window of time 430 to 432 will also fall within the window segment of length x spanning 430 to 431, and this fraction will be equal to the ratio x/W. The terminology "on average" makes clear that this property does not necessary hold true for any one window's worth of samples. But as more and more windows are taken together and averaged, the ratio of the number of samples falling within the region 430 to 431 to the number of samples falling within the total window 430 to 432 becomes increasingly likely to fall close to x/W. Sampling over multiple windows produces a statistical outcome that is similar to averaging. Thus, considering an entire ensemble of windows, a count taken of all samples that fall within front portions 430 to 431 of the windows can be divided by a count of all samples within all windows to achieve a ratio approaching x/W. It will be appreciated that the certainty in the ratio being near x/W increases with increasing numbers of windows (or samples).

Figure 19:
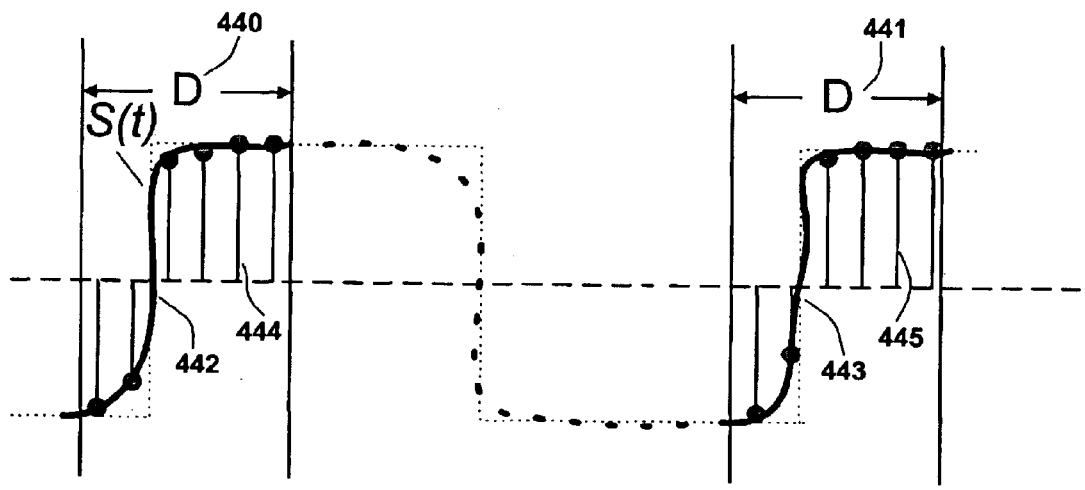
FIG. 19 shows samples taken on a more realistic PN level transition.

Thus far, the emphasis of the disclosure presented has been on the ratio of number of samples in one segment of a window to the number of samples in the entire window and it has been noted how the confidence in this ratio improves by summing over multiple windows. But the abovementioned property readily extends to the values of the samples themselves if areas, rather than line segments are used to define the ratio. That is, under certain assumptions, the ratio between two summations of samples taken from different portions of a series of windows approaches the ratio of areas traced out by the continuous signal S(t) in each portion of the window. Moreover, the ratio is increasingly refined as the number of windows and thus the number of samples increases. The assumption is that the data, over which each of the two summations is taken, follows similar trends in each window as shown in FIG. 19. Here, the windows 440 and 441 are centered on similar regions, specifically the L-H transitions. By virtue of the fact that samples values 444 and 445 and others follow a characteristic shape of the waveform 442 and 443 of the PN code as it makes the L-H transition, they are roughly consistent from one window to the next. Furthermore, the uniform distribution of sample points along with a large number of samples assures that samples are evenly and densely dispersed across the signal S(t). Note that the data waveforms 442 and 443 have been shown with rounding indicating the effect of filtering in the RF front end of the receiver 10. Even though the waveforms 442 and 443 are not identical, they are similar enough in shape and amplitude for the arguments of consistency to hold true. The values such as 444 and 445 of the waveform are consistently of similar size and follow similar trends within each window and the densely dispersed samples, on average, characterize this consistency. Thus, as stated, the ratios of the windowed sums of sample values tend to equal the ratios of their corresponding areas under the S(t) curve.

As a further point, it will be appreciated that there are benefits of having multiple windows in the accumulation interval. However, it may also be appreciated that only one window may be utilized rather than a series of windows, provided that enough data points were taken within the single window to accurately fit the curve S(t). In practice, however, the data is corrupted by noise. Furthermore, this noise is highly correlated for points that are near to one another. By sampling over multiple windows that are spaced relatively far apart (e.g., one chip length) the noise is substantially decorrelated. Once noise is no longer correlated, the inclusion of additional points in a summation has the effect of averaging out and thereby canceling the noise. That is, the effect of the noise is removed to a high degree so that the summation more accurately reflects the true properties of the noise-free PN waveform over the window.

Returning now to Eq. (4) and Eq. (5) that were derived using areas as depicted in FIG. 16, in light of the observation that summations are proportional to areas, summations may be substituted for areas. That is:

$$d = w \times \frac{\sum_{samples \in LH_{windows}} samples}{\sum_{samples \in LH_{windows}} |samples|} \quad (6);$$

for samples taken over L-H transitions $$d = -w \times \frac{\sum_{samples \in HL_{windows}} samples}{\sum_{samples \in HL_{windows}} |samples|} \quad (7);$$

for samples taken over H-L transitions where samples $\in LH_{windows}$ denotes that samples are taken over the L-H windows and samples $\in HL_{windows}$ denotes that samples are taken over the H-L windows. The actual number of H-L or L-H windows over which summations occur depends on a pre-selected accumulation internal. In a C/A code tracker of an exemplary embodiment, the number of windows that fall within the C/A code sequence of 1023 chips that defines the accumulation interval.

As a further processing step, all data from the H-L transition is multiplied by (−1), and then summed over both types of transitions, treating the summation as one. Advantageously, the S'(k) series as depicted in FIG. 17C facilitates this computation. Letting S(k) denote the original samples within the H-L and L-H windows, then S'(k) is derived from S(k) by multiplying any data from S(k) that falls within a H-L transition by (−1).

That is:

$S'(k)=S(k)$ if $k \in LH_{window}$; and $S'(k)=-S(k)$ if $k \in HL_{window}$.

The code phase error, d, is then given by:

$$d = w \times \frac{\sum_{k \in LHHL_{windows}} S'(k)}{\sum_{k \in LHHL_{windows}} |S(k)|} \quad (8).$$

where the samples k are taken from both the L-H windows and H-L windows as indicated by $k \in LHHL_{windows}$. It should be noted that these windows are of width D=2×w. The windows are separated from one another by an integer multiple of one code chip's worth of phase when the exact multiple depending on the occurrence of L-H and H-L transitions within the particular PN code's waveform.

Therefore, disclosed herein in an exemplary embodiment is a way to directly measure the code phase error d, 322 (FIG. 14) by utilizing summations of data taken from windows roughly centered on transitions of the PN signal. The code phase error d, 322 when supplied to a feedback control law, provides fine-tuning of the centering of the window by causing adjustments to the reference model phase accumulation rate. Note that the units of d are also the units of w. If w is expressed in chips (e.g., one which phase increment) then the code phase error d is expressed in chips of code phase error. If w is in nanoseconds, then so is d.

One of the advantages and benefits of the disclosed method is that, in an exemplary embodiment, the computed code phase error, d as computed herein is not simply proportional to the code phase error (as in existing delay-lock-loops of current systems), rather d is an actual determined value for the code phase error, 322. Furthermore, d is a direct measure of code phase error regardless of signal strength of the received PN code. This means that the control law for maintaining code lock is easier to design and implement since there is not a dependency of loop gain on the received signal strength.

Figure 20:
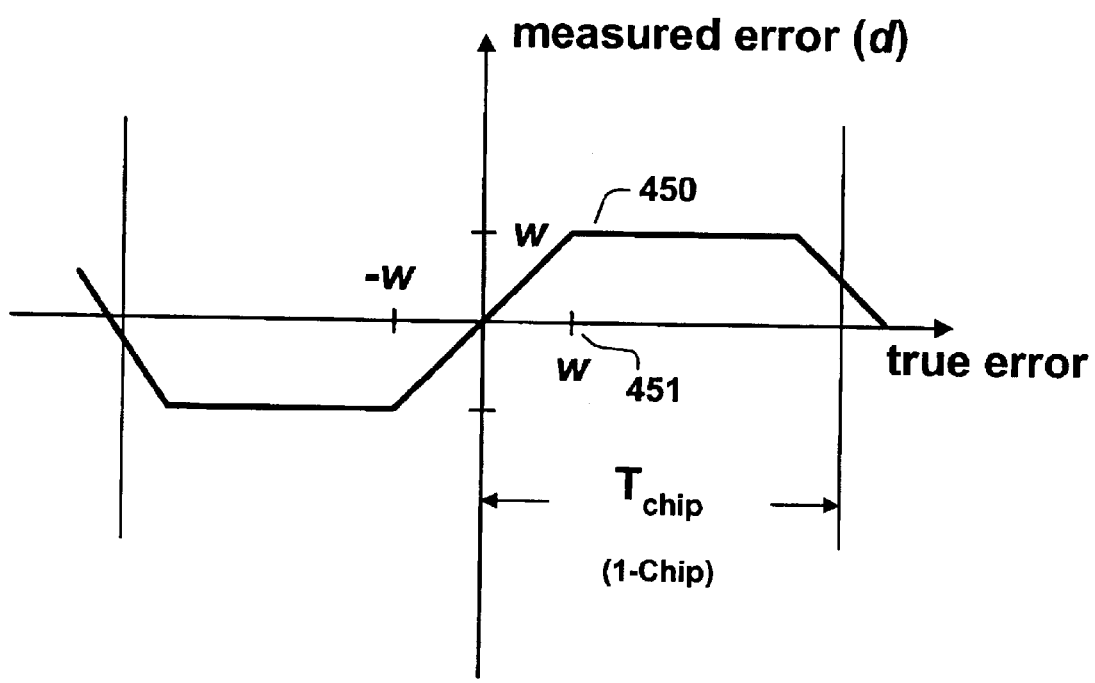
FIG. 20 depicts a measured phase error vs. true phase error for one embodiment of the present invention.

It will be appreciated that Equation (8) is accurate as long as the code phase error, d 322 does not exceed the half window width, w. Once the code phase exceeds w, Eq. (8) will no longer produce an accurate measure of code phase error d 322, but will instead saturate at +w or −w. This characteristic is depicted in FIG. 20 where measured code phase error, d 322, is plotted versus true phase error. The plot 450 is of unit slope (i.e. a one to one ratio) for true phase errors less than w (451) in magnitude and remains constant for true phase errors in excess of w. Nevertheless, the sign of the measured code phase error agrees with the sign of the true error and this holds true for up to one chip's worth of error. Because the sign is correct, a feedback control law employing this error works correctly to null out the error. With proper sign, the feedback control adjusts the model reference phase to the point that the window eventually becomes centered on the transition where the phase error measurement is reliable.

It will be appreciated that to accommodate larger error, the window could be widened, but the phase error measurement would then be increasingly affected by multipath as the window widens.

Consider multipath received signals that are sufficiently delayed with respect to the direct signal that its polarity transitions are outside the window. The affect of this multipath is to alter the result of the summations in Eq. (8). due to the delay of the multipath, on average, the multipath signal maintains constant amplitude throughout the window. Let m(k) denote the sampled multipath signal and let M be its average amplitude. Furthermore, let N denote the total number of points within the summations of Eq. (8). Assume that the window is exactly centered on the level-transition as is often the desired situation. This means that the term $\Sigma S'(k)$ should be zero. If the average amplitude of $S(k)$ is $A$, then Eq. (8) reduces to:

$$|d_{multipath}| = \left| \frac{w \times \sum_{k \in LHHL_{windows}} m(k)}{\sum_{k \in LHHL_{windows}} |S(k) + m(k)|} \right| = \frac{w \times N \times M}{N \times (A + M)} = \frac{w \times M}{A + M}$$

same polarity as $S(k)$; and $$|d_{multipath}| = \left| \frac{w \times \sum_{k \in LHHL_{windows}} m(k)}{\sum_{k \in LHHL_{windows}} |S(k) - m(k)|} \right| = \frac{w \times N \times M}{N \times (A - M)} = \frac{w \times M}{A - M}$$

opposite polarity to $S(k)$;
where $d_{multipath}$ is the erroneous code phase error measurement that results from the multipath. If $M$ is fairly small compared to $A$, then the above equations both simplify to:

$$|d_{multipath}| \approx \frac{w \times M}{A} \text{ for } M << A.$$

It may be seen that multipath induced error depends on the ratio of the multipath amplitude $M$ to the signal amplitude $A$. Furthermore, the error depends directly on the window's size $w$. Advantageously, decreasing window size decreases the effect of multipath on the code phase error measurement, however, the window size must still be maintained large enough to avoid having the code tracking loop lose lock. A very small window substantially reduces the track loop gain as track errors become large.

Figure 21:
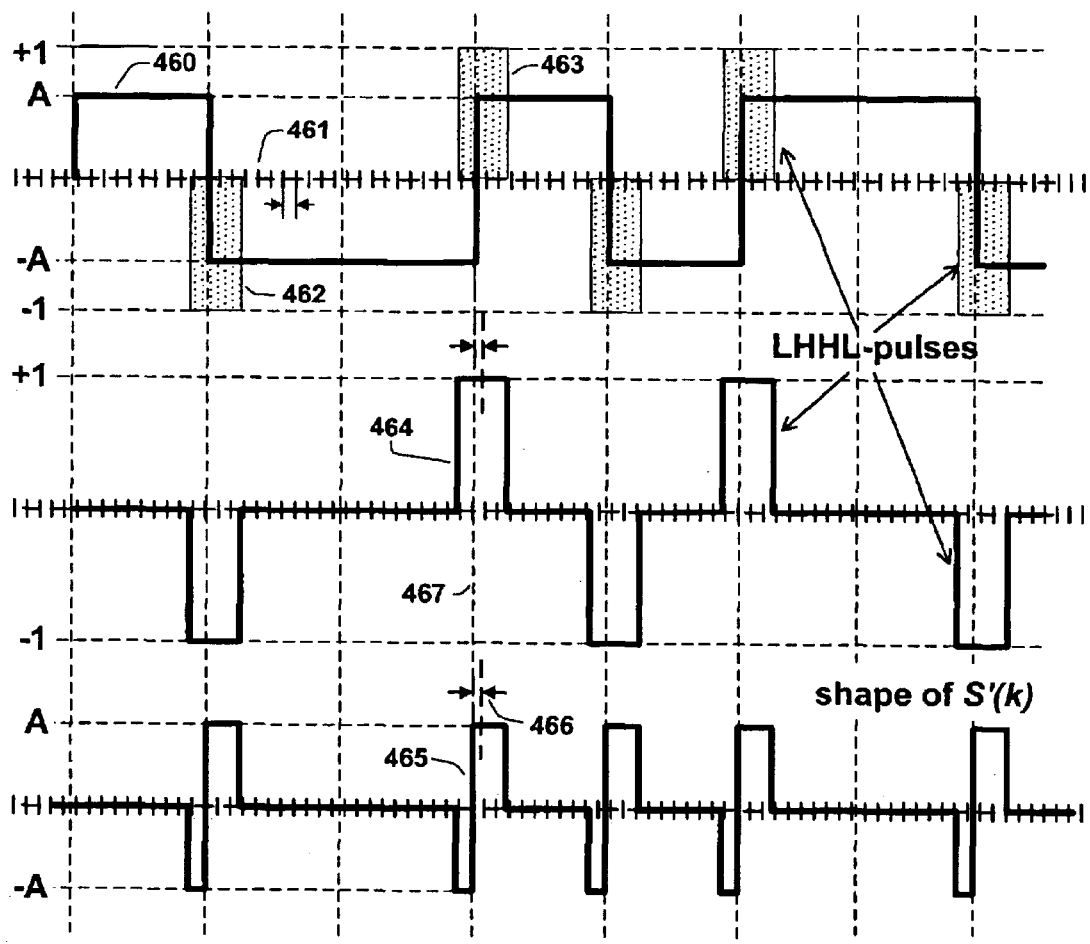
FIG. 21 is a graphical representation of sampling a PN sequence over windows centered near the level-transitions and then multiplying the samples by +1 for a L-H transition and −1 for a H-L transition.

Returning to Eq. (8), FIG. 21 illustrates a visualization of the forming of $S'(k)$ graphically. Recall that $S'(k)$ is defined as the data samples that fall within windows of the received PN code, with each window centered, or nearly centered, on a level-transition. Furthermore, data that is sampled in the vicinity of the H-L transitions are multiplied by −1 to reverse their polarity when forming the samples $S'(k)$. The received PN sequence is shown as 460. Samples of this sequence are taken at fixed intervals represented by the tic marks such as 461. Data is sampled only in windows such as 462 and 463. Furthermore, data sampled in windows surrounding a H-L transition is multiplied by −1. The window 462 surrounds an H-L transition and is shown extending downward to −1. The window 463 surrounds a L-H transition and extends upward to +1. To make the distinction that these windows have an associated polarity, we refer to them as "pulses". If the composite of all such pulses is used to form a new signal 464, it will take values of +1, −1 and zero. The signal 464 can be multiplied by the samples of the signal 460 to produce the series $S'(k)$. The signal 465 outlines the shape of $S'(k)$. Note that when the pulses are exactly centered on the chip transition 467, the code phase error denoted in this figure as 466 reduces to zero. At this point, the summation of samples of $S'(k)$, if taken over a suitably long accumulation interval, will be zero since the negative and positive portions will cancel.

Now consider a means to reduce or eliminate multipath in accordance with an exemplary embodiment. Let another signal $u'(j)$ be introduce and summed into the numerator of Eq. (8) such that $[\Sigma u'(j)]=0$. This leads to:

$$d = \frac{w \times \left[ \sum_{k \in LHHL_{windows}} S'(k) + \sum_{j \in A234_{windows}} u'(j) \right]}{\sum_{k \in LHHL_{windows}} |S(k)|} \quad (9).$$

Since $[\Sigma u'(j)]=0$, Eq. (9) yields the same result as Eq. (8). The data series $u'(j)$ is generated in means similar to the generation of $S'(k)$. To form $u'(j)$, the received PN code is multiplied by a set of windows that we denote the $A234_{windows}$. Like the $LHHL_{windows}$, the $A234_{windows}$ have an associated set of pulses. When these pulses are multiplied by the received PN sequence, they produce a balanced result that sums to zero.

FIG. 22 depicts additional pulses (i.e., areas associated therewith) added for the purpose of reducing or eliminating multipath. The composite pulsed signal 501 depicts a set of pulsed-windows, which have been shown extending positive or negative to represent their polarity. The dotted line, 500, represents the received PN code sequence. Both a non-transition at clock edge 506, and a L-H transition at clock edge 507 are shown for the received PN code. A H-L transition is not shown, with the understanding that signs of the pulsed-windows reverse in the case of a H-L transition. The pulse 505 of absolute area, $A_1$ is the previously discussed LHHL window. Additional pulses 502, 503, and 504 of absolute areas $A_3$, $A_2$ and $A_4$, respectively have been added to form the composite signal 501. The pulsed window 502 of area $A_3$ directly precedes a non-transition portion of the PN code as depicted, and always takes the same sign as the reference PN code. Consequently, the product of $A_3$ with the reference PN code is always positive. If the reference code phase is aligned with the received PN code's phase to within roughly one chip, the product of $A_3$ with the received PN code is also positive as indicated by the '°' sign in 502. It remains positive for up to a chip width of misalignment between the reference model signal and the received PN code.

Figure 22A:
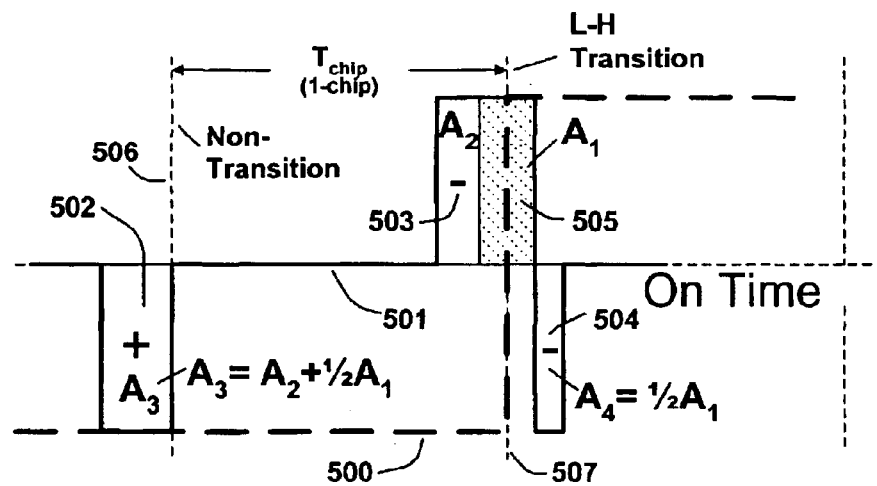
FIG. 22A depicts pulsed windows designed to give phase error curve that is less susceptible to multipath induced errors, the pulses aligned with the level transition's chip edge as is intended to produce zero phase error.

Products of pulses $A_1$, $A_2$ and $A_4$ with the received PN code can take either positive or negative values according to the alignment of the composite pulsed signal 501 with the received PN code 500. In FIG. 22A, the composite pulsed signal is properly aligned with the PN code to achieve zero code phase error. By design, it is aligned as in FIG. 22A when "perfect" phase tracking occurs and is designated as being "on time" since it is neither early (advanced) nor late (delayed). In this situation, the product of the pulses with the received PN code results in signs shown in 502, 503 and 504, which are either '+' or '−'. During "on time" alignment, the product of the pulse $A_1$ with the PN code averages to zero since it is balanced on either side of the code transition. Consequently, no sign is given for 505 in FIG. 22A.

Figure 22B:
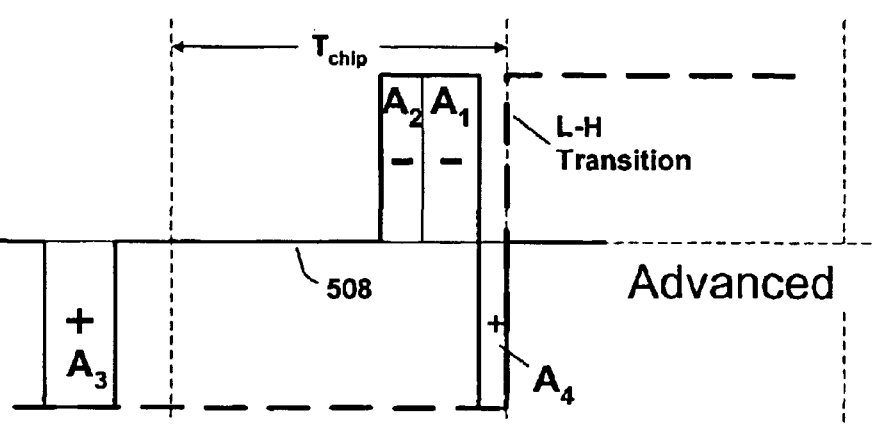
FIG. 22B depicts pulsed windows designed to give phase error curve that is less susceptible to multipath induced errors, the pulse advanced to the left sufficiently to cause the resulting asymmetric error function to again produce zero phase error.
Figure 22C:
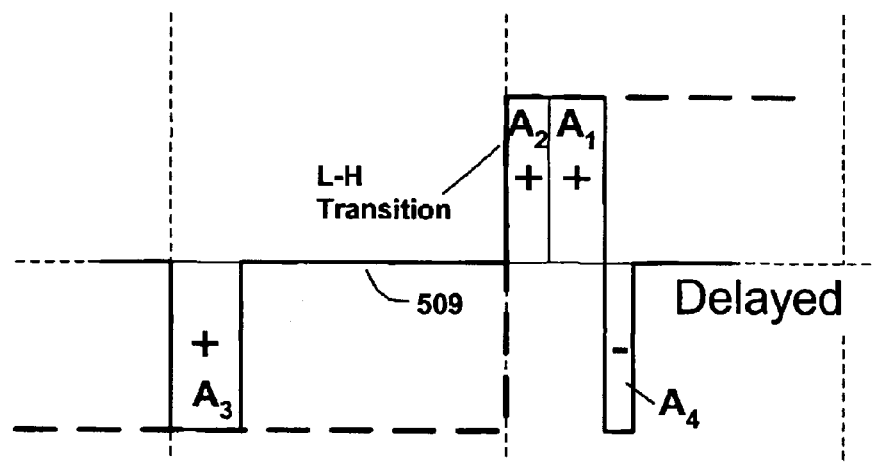
FIG. 22C depicts pulsed windows designed to give phase error curve that is less susceptible to multipath induced errors, the pulses delayed to the point that resulting phase error is at maximum positive value.

Turning to FIG. 22B, the composite pulsed signal 508 for the reference arrives early with respect to the received PN code and has been sufficiently advanced that all pulses lie to the left of the L-H transition of the received code. The signs that result when the product is formed are then positive for $A_3$ and $A_4$ and negative for $A_1$ and $A_2$. In FIG. 22C the composite pulse signal 509 arrives late with respect to the received PN code and has been sufficiently delayed so that all pulses lie to the right of the L-H transition of the received code. Products of $A_1$ and $A_2$ with the received PN code are now positive and $A_4$ becomes negative. As is always the case for small phase offsets, the $A_3$ product remains positive.

In an exemplary embodiment, $A_1$ and $A_2$ are of selectable areas, each area defined by its respective width. The introduction of area $A_2$ causes an asymmetric effect that may be seen in the phase error graph of FIG. 24A. It will be appreciated that this asymmetric nature of the phase error graph is advantageous for reducing multipath while maximizing ability to maintain lock.

Areas $A_3$ and $A_4$ are related to $A_1$ and $A_2$ by the following $$A_3 = A_2 + A_1/2$$

$$A_4 = A_1/2$$

Let $\Sigma$ represent the sum area of the product of the composite set of pulses with the received PN sequences. For the three cases depicted in FIGS. 22A–22C:

(a) On time: $\Sigma = A_3 - A_2 - A_4 = (A_2' A_1/2) - A_2 - A_1/2 = 0$;

(b) Advanced: $\Sigma = A_3 + A_4 - A_2 - A_1 = (A_2 + A_1/2) + A_1/2 - A_2 - A_1 = 0$; and (c) Delayed: $\Sigma = A_3 + A_1 + A_2 - A_4 = (A_2 + A_1/2) + A_1 + A_2 - A_1/2 = A_1 + 2A_2$.

Figure 24A:
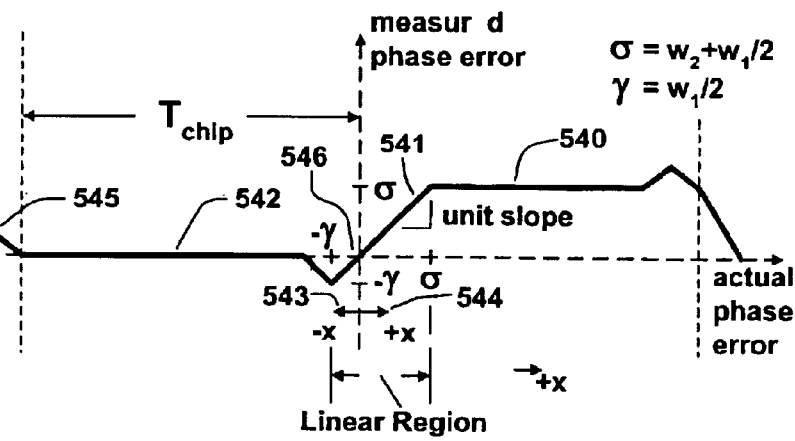
FIG. 24A depicts the phase error curve that results from using the pulses of FIG. 22 and FIG. 23.

It should be noted that for both the "on time" and the "advanced" cases, the sum area is zero. The "delayed" case yields a positive result. It should be appreciated that the placement and shapes of the pulses of areas $A_1$, $A_2$, $A_3$ and $A_4$ of FIG. 22 are not arbitrary. Their placement has been chosen to yield desired characteristics in the resulting phase error curve as depicted in FIG. 24A. Furthermore, consideration has been given to the fact that in a given receiver 10 the processing of the PN signal disclosed herein is "down stream" of filtering on the PN signal that causes rounding of the PN code edges as well as transitions of polarity that are not instantaneous, but sloping. When the pulses are properly phase aligned with the incoming PN sequence, the pulse $A_1$ cancels areas on either side of a sloping transition as well as an abrupt transition. Furthermore, pulses $A_2$ and $A_4$ are far enough removed from the transition, that they should see similar signal levels as seen by pulse $A_3$ and the three pulses should cancel when multiplied by the data.

In view of the need for computing the true (e.g., deterministic) code phase error rather than a proportional phase error, it is beneficial to divide all sum areas by the absolute value of the areas $A_1 + A_2$, as well as multiply by the product of D/2 where D is the combined width of $A_1 + A_2$. That is:

$$Code\ Phase\ Error, d = \frac{D \sum Areas}{2(A_1 + A_2)}$$

Figure 23A:
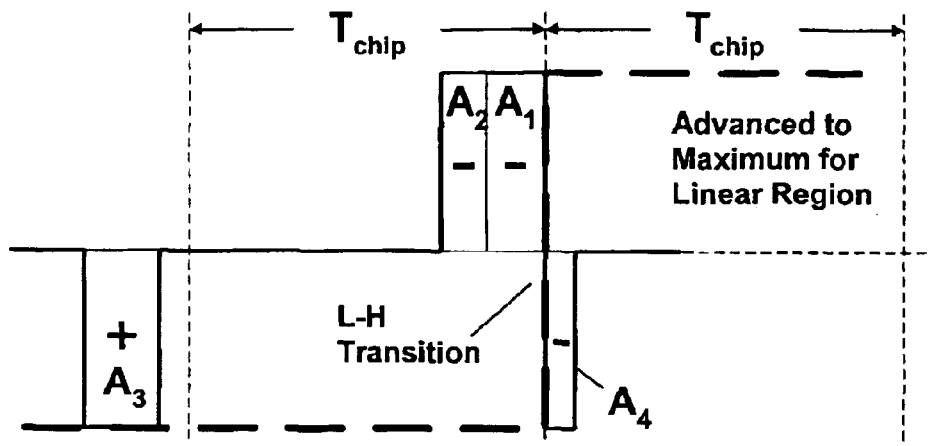
FIG. 23A depicts pulsed windows designed to give phase error curve that is less susceptible to multipath induced errors, the pulses advanced to the point of minimum resulting phase error.
Figure 23B:
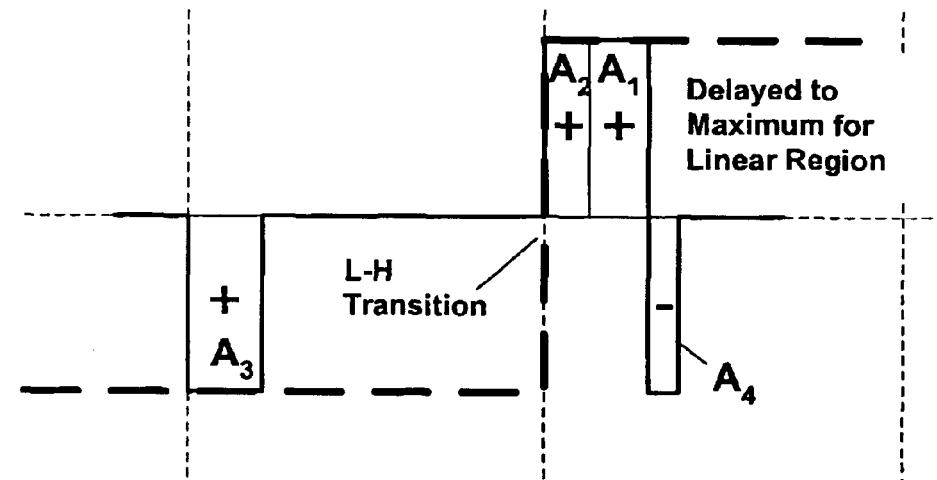
FIG. 23B depicts pulsed windows designed to give phase error curve that is less susceptible to multipath induced errors, the pulses delayed to the point of near maximum resulting phase error.

Two situations of relevance to the region over which phase error may accurately be measured are depicted in FIGS. 23A and 23B. Here the maximum shifts of the pulse signal are shown for which the measured phase error remains accurate and linear. From the figure, it may be observed that:

(a) Advanced to Edge of Linear Region (minimum measurable phase error):

$$Code\ Phase\ Error, d = \frac{D(A_3 - A_2 - A_1 - A_4)}{2(A_1 + A_2)} =$$

$$\frac{-DA_1}{2(A_1 + A_2)} = -\frac{D}{2}\left[1 - \frac{A_2}{(A_1 + A_2)}\right] = -\frac{D}{2}(1 - \alpha)$$

(b) Delayed to Edge of Linear Region (maximum measurable phase error):

$$Code\ Phase\ Error, d = \frac{D(A_3 + A_2 + A_1 - A_4)}{2(A_1 + A_2)} =$$

$$\frac{-D(2A_2 + A_1)}{2(A_1 + A_2)} = \frac{D}{2}\left[1 + \frac{A_2}{(A_1 + A_2)}\right] = \frac{D}{2}(1 + \alpha)$$

where $a = A_2/(A_2 + A_1) = w_2/D$ and $w_2$ is the width of $A_2$.

Figure 24B:
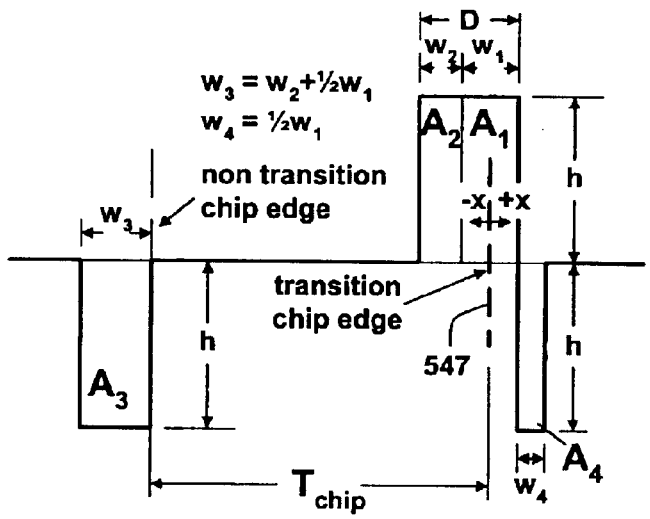
FIG. 24B provides definition of the dimensions that may be used to achieve the desired ratio of areas of the pulses as are need to produce the phase error curve in FIG. 24A.

The preceding equations for phase area can also be expressed in terms of the widths of each area, provided the areas take on the same height, h. Let $w_1$, $w_2$, $w_3$ and $w_4$ be the respective widths of $A_1$, $A_2$, $A_3$ and $A_4$ as shown in FIG. 24B. Furthermore, each area is of identical height h. Substituting, $A_i = hw_i$, (i=1–4), $D = w_1 + w_2$ and substituting $a = w_2/D = w_2/(w_1 + w_2)$ gives the maximum and minimum phase errors than can be accurately measured.

(a) Advanced to Edge of Linear Region (minimum measurable phase error):

$$Code\ Phase\ Error, d = -\frac{D}{2}(1 + \alpha) = (-w_1/2);$$

(b) Delayed to Edge of Linear Region (maximum measurable phase error):

$$Code\ Phase\ Error, d = \frac{D}{2}(1 + \alpha) = (w_2 + w_1/2).$$

In the linear region, at any given alignment of pulse signal with PN code, the sum of the areas is a constant. This is represented by:

$$Code\ Phase\ Error, d = \frac{DC}{2(A_1 + A_2)} = \frac{DC}{2Dh}$$

where C is the constant, and h is the height areas $A_1$ and $A_2$.

Now assume there is a shift a small increment x to the left. An additional positive area of hx is "acquired" and a negative area of −hx is "lost", for a net positive gain of 2 hx. This yields:

$$Code\ Phase\ Error, d = \frac{D(C + 2hx)}{2Dh}$$

provided that the phase displacement x is in the linear region. Differentiating with respect to x yields the slope of the code phase error d:

∂(Code Phase Error, $d$)/∂$x$=D2h/2Dh=1.

This result shows unity slope, as is desired. Advantageously, the chosen phase error equation indeed measures a true code phase error, even for the more difficult to analyze case of asymmetric pulses. It will be appreciated that the utilization of the areas $A_1$ and $A_2$ in the denominator of the above equation is of significant benefit to obtaining a true measure of phase error that is extremely accurate for small phase offsets. It may readily be appreciated that while division by other quantities, such as other areas and combinations of areas or signal power level determined from a prompt PN code's accumulation may be employed, not all such quantities provide proper scaling. Only areas that coincide with a level transition (or occur at the same frequency as level transitions, or are somehow made proportional to the number of level transitions) may be used. $A_1$ and $A_2$ are areas that coincide with a level transition.

Changes in phase error effect only the summations that straddle the level transitions; the summations over other windows (e.g., non-transition windows and windows such as $A_4$) are relatively uneffected. In other words, a change in phase error will result in a change in the summation value in the numerator of Eq. (8) or Eq. (9) that is proportional to the number of level transitions as well as the size of the phase error. To achieve accurate scaling and to produce true phase error, the summations are divided by another summation that is also proportional to the number of level transitions. In addition, the summation by which you divide should be designed to be independent of the exact location of the level transition relative to the summation window. This is why absolute values are used in the summation in the denominator of Eq. (8) or Eq. (9); they cause the data to take a positive sign on both sides of the transition so that all data is positive regardless of the transition's location. Finally, to complete the scaling, and to get the true phase error, a multiplication by a selected scaler, D/2 is employed, where D is the width of the window used in the summation in the denominator of Eq. (8) or Eq. (9).

The use of $A_1$ and $A_2$ may have an additional advantage in that they may better account for the effects of signal attenuation and rounding (caused by limited receiver bandwidth) in the vicinity of the transition. Because the areas $A_1$ and $A_2$ are near the transition (and, for the most part straddle the chip transition), they contain all the information as to the whereabouts of the transition's location (e.g., the phase error). Therefore, it is advantageous to divide by the absolute areas of $A_1$ and $A_2$ when normalizing the phase error to produce a true phase error (of unit slope). In other words, as the samples in the vicinity of the transition are summed, the areas $A_1$ and $A_2$ provide an accurate estimate of the magnitude of the samples despite the variability in the amplitudes and transition due to filtering effects.

From the above analysis it is possible to plot the error curve for the measured phase error. The code phase error d, 322 for the asymmetric pulse signal is shown in FIG. 24A. Within the linear region from $-(w_2/2)$ to $(w_2+w_1/2)$, the method accurately measures code phase error d, 322. Zero error, indicating perfect alignment of the pulsed (reference) signal with the received PN code, occurs when unit-sloped curve 541 crosses the horizontal axis at 546. The pulses in FIG. 24B are shown in perfect alignment with the chip edge L-H transition 547. Errors to the left, denoted −x (543), occur when the phase of the pulsed (reference) signal leads the PN code phase. Errors to the right, denoted +x (544), are indicative of a lagging pulsed (reference) signal. Notice that when the lead is sufficiently large, the phase error curve 542 becomes zero. As will be shown, this has the advantage of eliminating the effect of multipath when the pulses sufficiently lead the multipath signal (multipath, naturally, lags so the pulses when aligned with direct signal lead the multipath). It is, however, undesirable to operate the GPS receiver 10 such that the direct signal is in region (542) of the curve. Because the measured code phase error here (to the left of $-w_1/2$) is zero, there is no reliable indication of true phase error and loss of phase lock may occur. That is, in this region even if there were an error a tracking loop would not be able to correct for it. It should be noted that the search and acquisition logic of the GPS receiver 10 starts the initial tracking at a code phase error preferably close to zero, but if biased, biased to the right (lagging) so that proper pull-in of the track loop can occur due to an always positive phase error 540.

Figure 25A:
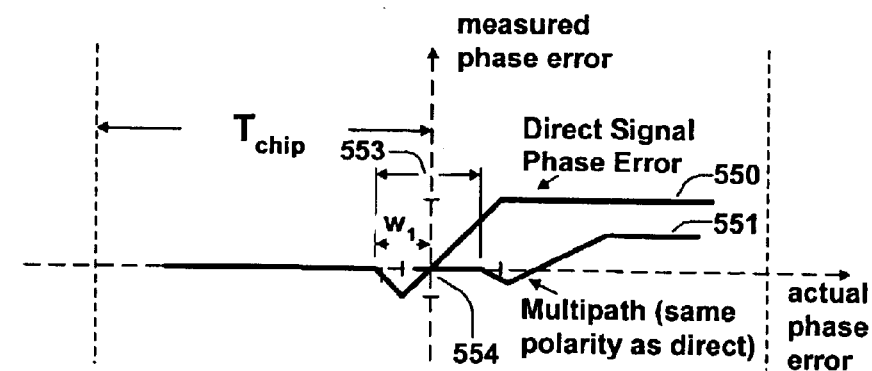
FIGS. 25A, and 25B depict direct and multipath error signals superimposed on one another, for the purpose of showing the multipath reducing benefit of the invention.
Figure 25B:
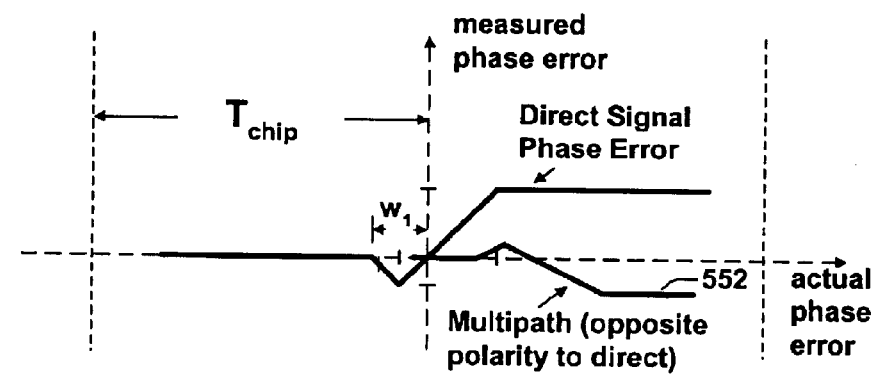

Turning now to FIG. 25 where the code phase error curve 550 is shown and also multipath phase error curves 551 and 552. It may readily be observed that the asymmetric phase error is beneficial for reducing multipath. As the figures depict, the multipath is always delayed with respect to the direct signal as shown by the offset 553. The multipath 551 in FIG. 25A is of same polarity as the direct PN signal, but it is equally likely that the multipath will be of opposite polarity to the direct signal as shown by 552 of FIG. 25B. Since multipath enters the system linearly, superposition holds. That is, the total phase error is the sum of code phase error 550 from the direct PN signal and the code phase error 551 or 552 from the multipath signal. When the multipath signal is delayed by more than the duration of $w_1$, it no longer has an effect on the zero cross point 554 of the direct signal's code phase curve. Since the receiver operates to maintain near zero code phase error, the adverse effects of the multipath are eliminated for multipath delayed by more than $w_1$.

It may further be appreciated that another anomaly arises, however, if the multipath is delayed by slightly more than one chip. In FIG. 24A there is shown a positive region 545 in the code phase error curve that is slightly more than one chip advanced from the zero phase error point, 546. It may now readily be appreciated based upon the teachings herein, that this positive region may also be removed by adding additional pulses in the vicinity of the non-transition pulse $A_3$. The goal is to make the composite set of pulses on a non-transition similar in shape to that of the composite set of pulses on a transition, but still keeping the total area of the non-transition pulses equal to $A_3$. This may be accomplished with an additional set of positive and negative pulses, denoted as $A_5$ and $A_6$ that have equal areas (opposite polarity) and thus cancel. Due to the area cancellation, all the derivations relating to FIGS. 22A–22C and FIGS. 23A–23B still hold.

Figure 26A:
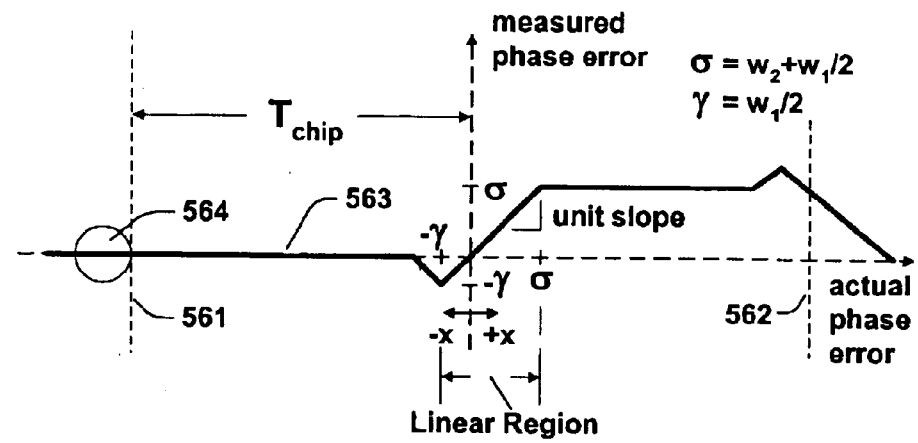
FIG. 26A depicts an improved phase error curve that exhibits better immunity to multipath that is delayed by approximately one code chip.
Figure 26B:
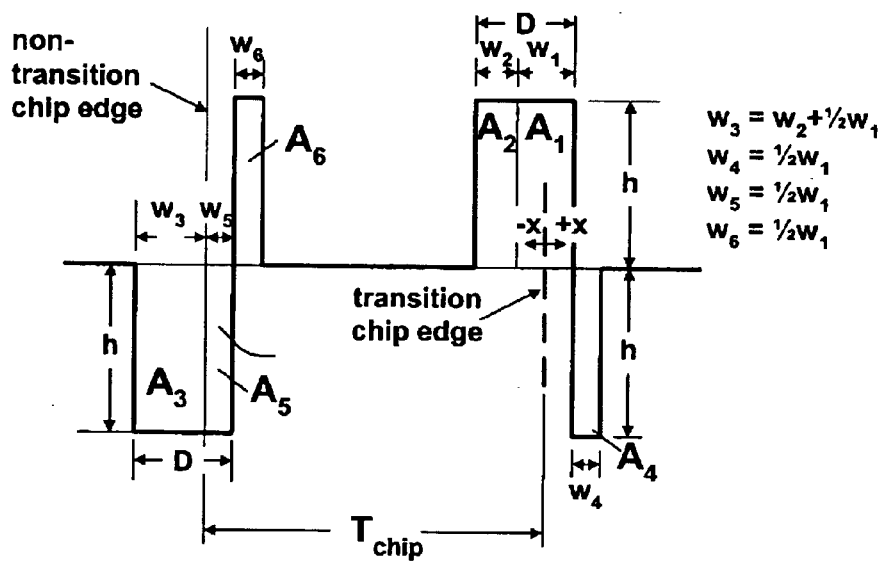
FIG. 26B provides definition of the dimensions of pulses used to achieve the phase error curve of FIG. 26A.

Turning now to FIGS. 26A and 26B, FIG. 26B depicts a set of pulsed windows for generating the asymmetric code phase error measurement in accordance with an exemplary embodiment. FIG. 26B shows the addition of two pulses with equal areas $A_5$ and $A_6$ but opposite signs. As is apparent in the figure, the shape of the composite of pulses ($A_1$, $A_2$ and $A_4$) in the region of a transition is now similar in shape to the composite of pulses ($A_3$, $A_5$ and $A_6$) in the region of a non-transition. FIG. 26A shows the resulting phase error curve. The phase error curve is virtually unchanged relative to FIG. 24A over a region from one chip advanced 561 to one chip delayed 562. The left-hand portion 563 of the code phase error curve in FIG. 26A now remains zero, even in the region 564 where the measured code phase error 545 of FIG. 24A was shown to be non-zero. This is a result of the additional pulses $A_4$ and $A_6$ that cause the non-transition composite pulse set to balance with the transition composite pulse set when the reference phase leads by a chip or more. Therefore, to reject multipath of greater than on chip delay and generate an asymmetric phase error measurement, a set of pulsed windows in accordance with an exemplary embodiment as depicted in FIG. 26B may be utilized.

So far, the multipath mitigating phase error concept of an exemplary embodiment has been presented in graphical terms where pulses are depicted having areas $A_1$, $A_2$, $A_3$, $A_4$, $A_5$ and $A_6$. Although this has been beneficial for understanding the concept the actual preferred embodiment involves processing of discrete digital data. Recall that in an exemplary embodiment, sums over windowed sections of sampled data are computed rather than areas, which were employed for illustrative purposes. The windows are aligned in time according to the reference code phase (e.g. 324 FIG. 14) generated by the receiver 10. With the disclosure and teachings presented thus far, Eq. (9) may now be stated with greater detail of the summation as Eq. (10) below. The code phase error, d, 322 is given by $$d = \frac{D}{2}\left[\frac{\sum_{k \in A1_{windows} \cup A2_{windows}} \sigma_{1 \cup 2}(k)S(k) + \sum_{k \in A4_{windows}} \sigma_4(k)S(k) + \sum_{k \in A3_{windows} \cup A5_{windows}} \sigma_{3 \cup 5}(k)S(k) + \sum_{k \in A6_{windows}} \sigma_6(k)S(k)}{\sum_{k \in A1_{windows} \cup A2_{windows}} |S(k)|}\right] \quad (10).$$

In this instance, the notation $A1_{windows} \cup A2_{windows}$ denotes the composite of the $A_1$ and $A_2$ windows and $A3_{windows} \cup A5_{windows}$ denotes the composite of the $A_3$ and $A_5$ windows. The notation $k \in A4_{windows}$, for example, means that the received signal, $S(k)$, is sampled at all points k such that k falls within the windows of area $A_4$. Note that the $A1_{windows}$, $A2_{windows}$ and $A4_{windows}$ all occur in the vicinity of a H-L transition or L-H transition and the $A3_{windows}$, $A5_{windows}$ and $A6_{windows}$ occur on non-transitions as shown in FIG. 26B. Also, as shown in FIG. 26B, D is the combined width of the $A_1$ and $A_2$ windows. The multipliers, $\sigma_i$, (i=1∪2,4,3↑5,6) take on values of +1 or −1, and are defined as follows:

$$\sigma_{1 \cup 2} = \begin{cases} +1 & \text{if } L\text{-}H \text{ transition of reference PN code,} \\ -1 & \text{if } H\text{-}L \text{ transition of reference PN code;} \end{cases}$$

$$\sigma_4 = \begin{cases} -1 & \text{if } L\text{-}H \text{ transition of reference PN code,} \\ +1 & \text{if } H\text{-}L \text{ transition of reference PN code;} \end{cases}$$

$$\sigma_{3 \cup 5} = \begin{cases} +1 & \text{if non-transition and polarity of} \\ & \text{reference PN code is positive,} \\ -1 & \text{if non-transition and polarity of} \\ & \text{reference PN code is negative;} \end{cases}$$

$$\sigma_6 = \begin{cases} -1 & \text{if non-transition and polarity of} \\ & \text{reference PN code is positive,} \\ +1 & \text{if non-transition and polarity of} \\ & \text{reference PN code is negative.} \end{cases}$$

Figure 27:
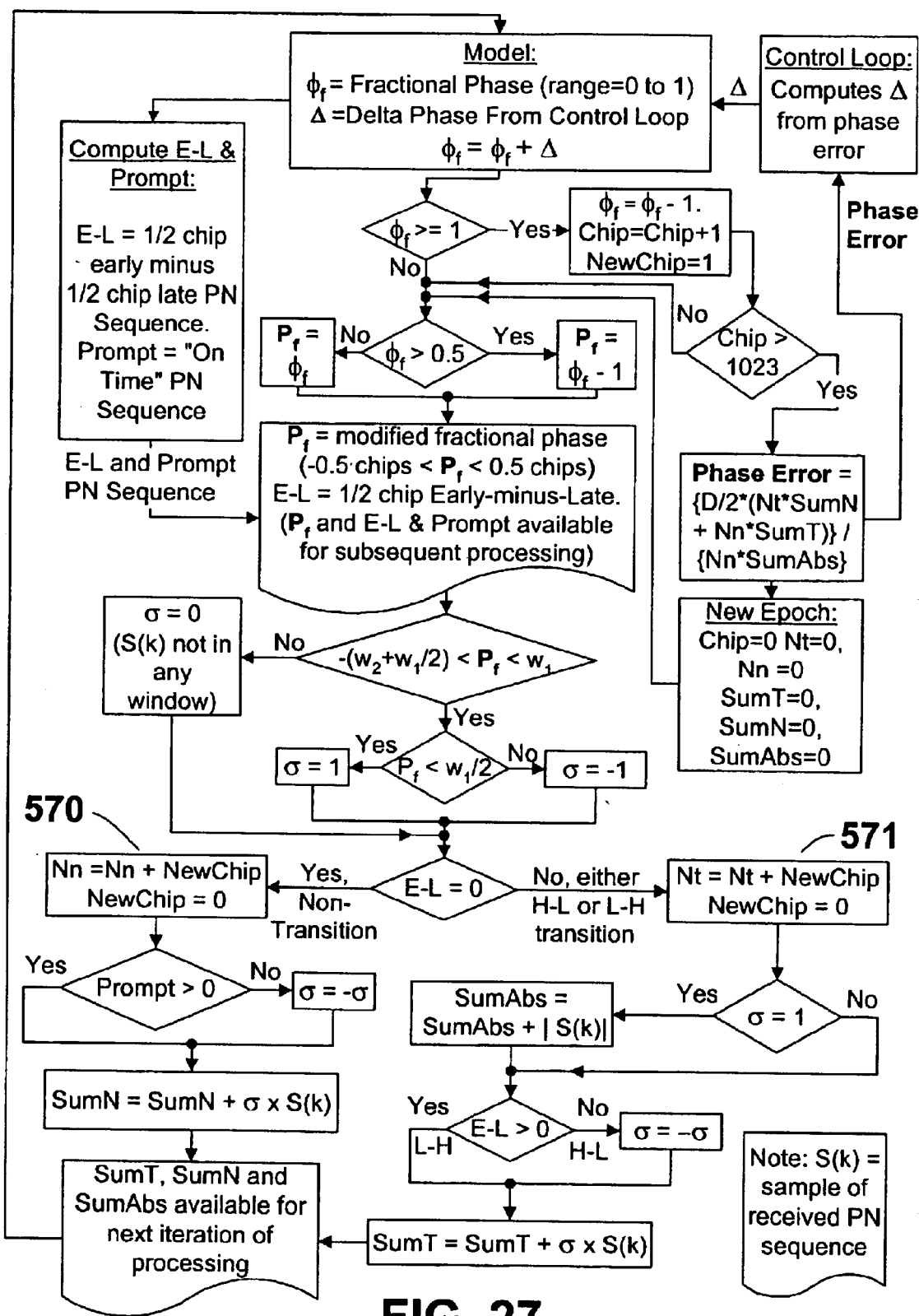
FIG. 27 depicts a flow chart illustrating an exemplary process 100 for phase error computation and utilization of the phase error to control the reference phase and to align it with the received PN phase.

In an exemplary embodiment, the prompt PN reference code and the conventional ½ chip late reference code (E-L PN code) (See FIGS. 5 and 6) are utilized as a means to compute the '+1' or '−1' sign represented by $\sigma$. The E-L reference code is positive on a L-H transition, negative on a H-L transition, and zero on a non-transition of the prompt PN reference code. When E-L is zero, the prompt code dictates the sign of the pulses with areas $A_3$, $A_5$ and $A_6$, otherwise, the E-L code dictates the sign of pulses with areas $A_1$, $A_2$ and $A_4$. The input PN code sequence, S(k) (e.g., FIG. 17B), is sampled in the various windows and appropriately multiplied by the correct sign based on the E-L and prompt reference codes. Summations are formed and the phase error is computed according to Eq. (10). FIG. 27 depicts a flow chart illustrating an exemplary process 100 for phase error computation and utilization of the phase error to control the reference phase and to align it with the received PN phase.

Observation of FIG. 27 brings to bear yet another beneficial aspect of an exemplary embodiment of the invention. Specifically, a count 570 and 571 is maintained for both transitions and non-transitions. It will be appreciated from the table of FIG. 15, that the number of transitions (either H-L or L-H) does not necessarily balance the number of non-transitions for C/A code. This is phenomenon is particularly true for satellites with PRN IDs, 7, 8, 15, 17, 21, 22, and 24. It should be further appreciated that the asymmetric set of pulses derived thus far for multipath mitigation presumes that the number of polarity transitions is equal to the number of non-transitions. However, as is evident from the table, they are not always equal. Moreover, it will be seen that if the inequality is not appropriately accounted for, a code phase error results.

One way to overcome this limitation is disclosed in yet another exemplary embodiment that maintains separate accumulated sums of transitions for the areas of transitions and the areas of non-transitions.

Let SumT=sum of product of PN code with $\sigma$ over areas $A_1$, $A_2$ and $A_4$, and let SumN=sum of product of PN code with $\sigma$ over areas $A_3$, $A_5$ and $A_6$ $A_1$, $A_2$, and $A_4$ occur in the vicinity of a transition. Let Nt be the number of such transitions within the accumulated summation. $A_3$, $A_5$ and $A_6$ occur in the vicinity of a non-transition. Let Nn be the number of non-transitions within the accumulated summation. Eq. (10) can then be modified as:

$$d = \frac{D/2[(Nt/Nn)SumN + SumT]}{SumAbs} \quad (11).$$

where $$SumT = \sum_{k \in A1_{windows} \cup A2_{windows}} \sigma_{1 \cup 2}(k)S(k) + \sum_{k \in A4_{windows}} \sigma_4(k)S(k)$$

$$SumN = \sum_{k \in A3_{windows} \cup A5_{windows}} \sigma_{3 \cup 5}(k)S(k) + \sum_{k \in A6_{windows}} \sigma_6(k)S(k)$$

$$SumAbs = \sum_{k \in A1_{windows} \cup A2_{windows}} |S(k)|$$

In an exemplary embodiment, the ratio Nt/Nn provides compensation to the summation, SumN, to account for the inequality between the transitions and non-transitions. Obviously, after reading this disclosure, one skilled in the art could devise other approaches to compensate for the lack of balance between the transitions and non-transitions. For example, in yet another embodiment, logic could be deployed that stopped summing SumT and SumN when their respective transition, Nt, or non-transition, Nn, reached a certain value. This value could be the minimum that either Nt or Nn could obtain if summations were continued to the end of the accumulation interval. In yet another approach of an exemplary embodiment an accumulator could be employed to keep track of total number of sample points utilized within each summation SumT and SumN with the realization that the number of sample points is proportional to the number of transitions and non-transitions, respectively.

Regardless, of the methodology, it will be appreciated that an exemplary embodiment of the invention provides compensation for unequal transition and non-transition densities in a pseudorandom code. Moreover, an exemplary embodiment of the invention removes the dependence of the code phase delay, d, on the transition type (HL of LH) by defining one transition window and using the S'(k) waveform to set the polarity of the window. Further yet, the concept may be extended to unequal HL and LH transitions by utilizing unique windows for the non-transition, HL transition and the LH transition cases and counting the corresponding occurrences with Nn, $N_{HL}$ and $N_{LH}$, respectively. In one embodiment a similar shaped window (only differing in sign) for the HL and LH transition windows and sets $Nt=N_{HL}+N_{LH}$ is employed.

As a further point, although an exemplary embodiment normalizes the phase error measurement to achieve unit slope, it should be appreciated that this does not have to be the case to take advantage of the compensation approach disclosed herein. That is, for example, the denominator in Eq. (11) or even the term "D/2" could be omitted and still yield a quantity that is proportional to the code phase error, d. The feedback control loop could readily be configured to use the proportional term rather than true error d.

It will be appreciated that the satellite systems as discussed herein may include but not be limited to Wide Area Augmentation System (WAAS), Global Navigation Satellite System (GNSS) including GPS, GLONASS, GALILEO, and other satellite ranging technologies. The term WAAS here is used as a generic reference to all GNSS augmentation systems which, to date, include three programs: WAAS (Wide Area Augmentation System) in the USA, EGNOS (European Geostationary Navigation Overlay System) in Europe and MSAS (Multifunctional Transport Satellite Space-based Augmentation System) in Japan. Each of these three systems, which are all compatible, consists of a ground network for observing the GPS constellation, and one or more geostationary satellites.

The disclosed invention can be embodied in the form of computer or controller implemented processes and apparatuses for practicing those processes. The present invention can also be embodied in the form of computer program code containing instructions embodied in tangible media 13, such as floppy diskettes, CD-ROMs, hard drives, or any other computer-readable storage medium, wherein, when the computer program code is loaded into and executed by a computer or controller, the computer becomes an apparatus for practicing the invention. The present invention may also be embodied in the form of computer program code as a data signal 15, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

It will be appreciated that the use of first and second or other similar nomenclature for denoting similar items is not intended to specify or imply any particular order unless otherwise stated.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best made contemplated for carrying out this invention, but that the invention will include all embodiments falling within the scope of the appended claims.

What is claimed is:

1. A method of measuring the phase of a pseudorandom (PN) sequence of chips, each chip having a polarity that is either positive or negative, and having a time duration, $T_{chip}$, the method comprising:

generating a reference model exhibiting a reference phase, said reference phase adjustable to facilitate alignment with said phase of said pseudorandom sequence;

establishing a plurality of pulsed-windows over which a plurality of samples of said pseudorandom sequence are collected for a selected accumulation internal;

accumulating said plurality of samples for each pulsed window of said plurality of pulsed windows to form a plurality of accumulated sums;

compensating each accumulated sum to form at least one compensated sum, if a number of level transitions and non-transitions of said pseudorandom sequence is not equal; and combining said compensated sum to determine a phase error from said plurality of compensated sums, said phase error corresponding to a phase difference between said reference phase and said phase of said pseudorandom sequence.

2. The method of claim 1 further including normalizing said phase error by dividing at least one of said compensated sums of said plurality of compensated sums, by a second summation taken only over pulsed windows that are based on a number of polarity transitions of the pseudorandom sequence.

3. The method of claim 1 wherein said plurality of pulsed windows is configured so that a misalignment of less than a selected width, between said reference phase and said phase of said pseudorandom sequence, results in said phase error. exhibiting a first polarity when said reference phase lags said pseudorandom sequence phase and a opposite polarity when said reference phase leads said pseudorandom sequence phase.

4. The method of claim 1 wherein said selected width is $w_1/2$, and $w_1$ is a selected width of an $A_1$ pulsed window.

5. The method of claim 1 wherein said at least one pulsed window is configured so that if said reference phase leads said phase of said pseudorandom sequence by more than a selected width but less than one chip width, said phase error is zero.

6. The method of claim 1 wherein said phase error is larger than any value of said phase error that occurs when said reference phase leads pseudorandom sequence phase, if said reference phase lags pseudorandom sequence phase by more than a selected width, but less than one chip width.

7. The method of claim 1 wherein said compensating includes scheduling a contribution to said combining for each pulsed window of said at said plurality of pulsed windows based on a number of level transitions and a number of non-transitions of said pseudorandom sequence.

8. The method of claim 1 wherein said phase error is proportional to a true phase error provided said phase error is less than a selected width.

9. The method of claim 1 wherein said compensating includes scheduling each respective contribution to said, based on a count Nt corresponding to a number of transitions of said pseudorandom sequence within a selected accumulation interval and a count Nn corresponding to a number of non-transitions of said pseudorandom sequence within said accumulation interval.

10. The method of claim 7 wherein Nt is equal to a number of transitions of said pseudorandom sequence within said accumulation interval and Nn is equal to a number of non-transitions of said pseudorandom sequence within said accumulation interval.

11. The method of either claim 7 wherein said count Nt is further subdivided into a count $N_{HL}$ and a count $N_{LH}$, where $N_{HL}$ is proportional to a number of high-low (HL) transitions of said pseudorandom sequence within said accumulation interval and $N_{LH}$ is proportional to a number of low-high (LH) transitions of said pseudorandom sequence within said accumulation interval and wherein said count $N_{HL}$ and said count $N_{LH}$ provide compensation for any inequality between HL transitions and LH transitions of said pseudorandom sequence.

12. The method of claim 9 wherein $N_{HL}$ is equal to said number of HL transitions of said pseudorandom code within said accumulation interval, $N_{LH}$ is equal to said number of LH transitions of said pseudorandom sequence within said accumulation interval, and Nn is equal to said number of non-transitions of said pseudorandom sequence within said accumulation interval.

13. The method of claim 1 wherein said pseudorandom sequence is broadcast from any satellite.

14. The method of claim 1 wherein said pseudorandom sequence is broadcast from a GPS satellite.

15. The method of claim 1 wherein said plurality of pulsed-windows exhibit variable widths.

16. The method of claim 1 wherein said plurality of pulsed-windows exhibit variable heights.

17. The method of claim 1 wherein said plurality of pulsed-windows are rectangular.

18. A method of measuring the phase of a pseudorandom (PN) sequence of chips, each chip having a polarity that is either positive or negative, and having a time duration, $T_{chip}$, the method comprising:

generating a reference model exhibiting a reference phase, said reference phase adjustable to facilitate alignment with said phase of said pseudorandom sequence;

establishing a pulsed-window over which a plurality of samples of said pseudorandom sequence are collected for a selected accumulation interval;

accumulating said plurality of samples for each pulsed-window to form at least one accumulated sum;

combining said at least one accumulated sum to determine a phase error, said phase error corresponding to a phase difference between said reference phase and said phase of said pseudorandom sequence; and normalizing said phase error by dividing said at least one accumulated sum, by a second summation taken only over pulsed windows that are based on a number of polarity transitions of said pseudorandom sequence.

19. The method of claim 18 wherein said normalizing further includes multiplying by a selected value that is proportional to a width of a window over which said second summation is taken.

20. A system for measuring the phase of a pseudorandom (PN) sequence of chips, each chip having a polarity that is either positive or negative, and having a time duration, $T_{chip}$, the system comprising:

a means for generating a reference model exhibiting a reference phase, said reference phase adjustable to facilitate alignment with said phase of said pseudorandom sequence;

a means for establishing a plurality of pulsed-windows over which a plurality of samples of said pseudorandom sequence are collected for a selected accumulation interval;

a means for accumulating said plurality of samples for each pulsed window of said plurality of pulsed windows to form a plurality of accumulated sums;

compensating each accumulated sum to form at least one compensated sum, if a number of level transitions and non-transitions of said pseudorandom sequence is not equal; and a means for combining said compensated sum to determine a phase error from said plurality of compensated sums, said phase error corresponding to a phase difference between said reference phase and said phase of said pseudorandom sequence.

21. The system of claim 20 further including a means for normalizing said phase error by dividing at least one of said compensated sums of said plurality of compensated sums, by a second summation taken only over pulsed windows that are based on a number of polarity transitions of the pseudorandom sequence.

22. A storage medium encoded with a machine-readable computer program code for measuring the phase of a pseudorandom (PN) sequence of chips, each chip having a polarity that is either positive or negative, and having a time duration, $T_{chip}$, said storage medium including instructions for causing controller to implement a method comprising:

generating a reference model exhibiting a reference phase, said reference phase adjustable to facilitate alignment with said phase of said pseudorandom sequence;

establishing a plurality of pulsed-windows over which a plurality of samples of said pseudorandom sequence are collected for a selected accumulation interval;

accumulating said plurality of samples for each pulsed window of said plurality of pulsed windows to form a plurality of accumulated sums;

compensating each accumulated sum to form at least one compensated sum, if a number of level transitions and non-transitions of said pseudorandom sequence is not equal; and combining said compensated sum to determine a phase error from said plurality of compensated sums, said phase error corresponding to a phase difference between said reference phase and said phase of said pseudorandom sequence.

23. A computer data signal embodied in a carrier wave for measuring the phase of a pseudorandom (PN) sequence of chips, each chip having a polarity that is either positive or negative, and having a time during, $T_{chip}$, said data signal comprising code configured to cause a controller to implement a method comprising:

generating a reference model exhibiting a reference phase, said reference phase adjustable to facilitate alignment with said phase of said pseudorandom sequence;

establishing a plurality of pulsed-windows over which a plurality of samples of said pseudorandom sequence are collected for a selected accumulation interval;

accumulating said plurality of samples for each pulsed window of said plurality of pulsed windows to form a plurality of accumulated sums;

compensating each accumulated sum to form at least one compensated sum, if a number of level transitions and non-transitions of said pseudorandom sequence is not equal; and combining said compensated sum to determine a phase error from said plurality of compensated sums, said phase error corresponding to a phase difference between said reference phase and said phase of said pseudorandom sequence.

* * * * *